United States Patent
Matsumura et al.

(10) Patent No.: US 7,306,544 B2
(45) Date of Patent: Dec. 11, 2007

(54) AUTOMATIC TRANSMISSION, CONTROL APPARATUS AND CONTROL SYSTEM

(75) Inventors: Tetsuo Matsumura, Hitachinaka (JP); Naoyuki Ozaki, Hitachinaka (JP); Takashi Okada, Hitachi (JP); Hiroshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 11/016,772

(22) Filed: Dec. 21, 2004

(65) Prior Publication Data

US 2005/0197232 A1    Sep. 8, 2005

(30) Foreign Application Priority Data

Dec. 22, 2003    (JP)    ............................. 2003-423961

(51) Int. Cl.
*B60W 10/02*    (2006.01)

(52) U.S. Cl. ...................... 477/180; 477/179

(58) Field of Classification Search ................ 477/179, 477/180, 181
See application file for complete search history.

(56) References Cited

U.S. PATENT DOCUMENTS 5,069,319 A * 12/1991 Makabe ........................ 477/39
5,896,963 A * 4/1999 Schwientek ................ 192/3.62
6,887,184 B2 * 5/2005 Buchanan et al. ........... 477/174
7,093,511 B2 * 8/2006 Norum et al. ................. 74/335

FOREIGN PATENT DOCUMENTS

| JP | 63-083436 | 4/1988 |
|---|---|---|
| JP | 2703169 | 3/1997 |
| JP | 2001-213201 | 8/2001 |
| JP | 2002-022003 | 1/2002 |

\* cited by examiner

*Primary Examiner*—Ha D. Ho
(74) *Attorney, Agent, or Firm*—Crowell & Moring LLP

(57) ABSTRACT

The thrust load of the friction transfer mechanism is adjusted with an electric actuator, the thrust load of said friction transfer mechanism is be increased with a fixed inclination, at the first stage from the time control is started to the time the predetermined time elapses, the inclination of the thrust load of said friction transfer mechanism is set to the inclination smaller than that of the thrust load of said friction transfer mechanism at said first stage, at the second stage where said friction transfer mechanism moves further to the predetermined position, and the thrust load of said friction transfer mechanism may be increased with the inclination larger than that of the thrust load of said friction transfer mechanism at said second stage, at the third stage where the predetermined time elapses further.

4 Claims, 19 Drawing Sheets

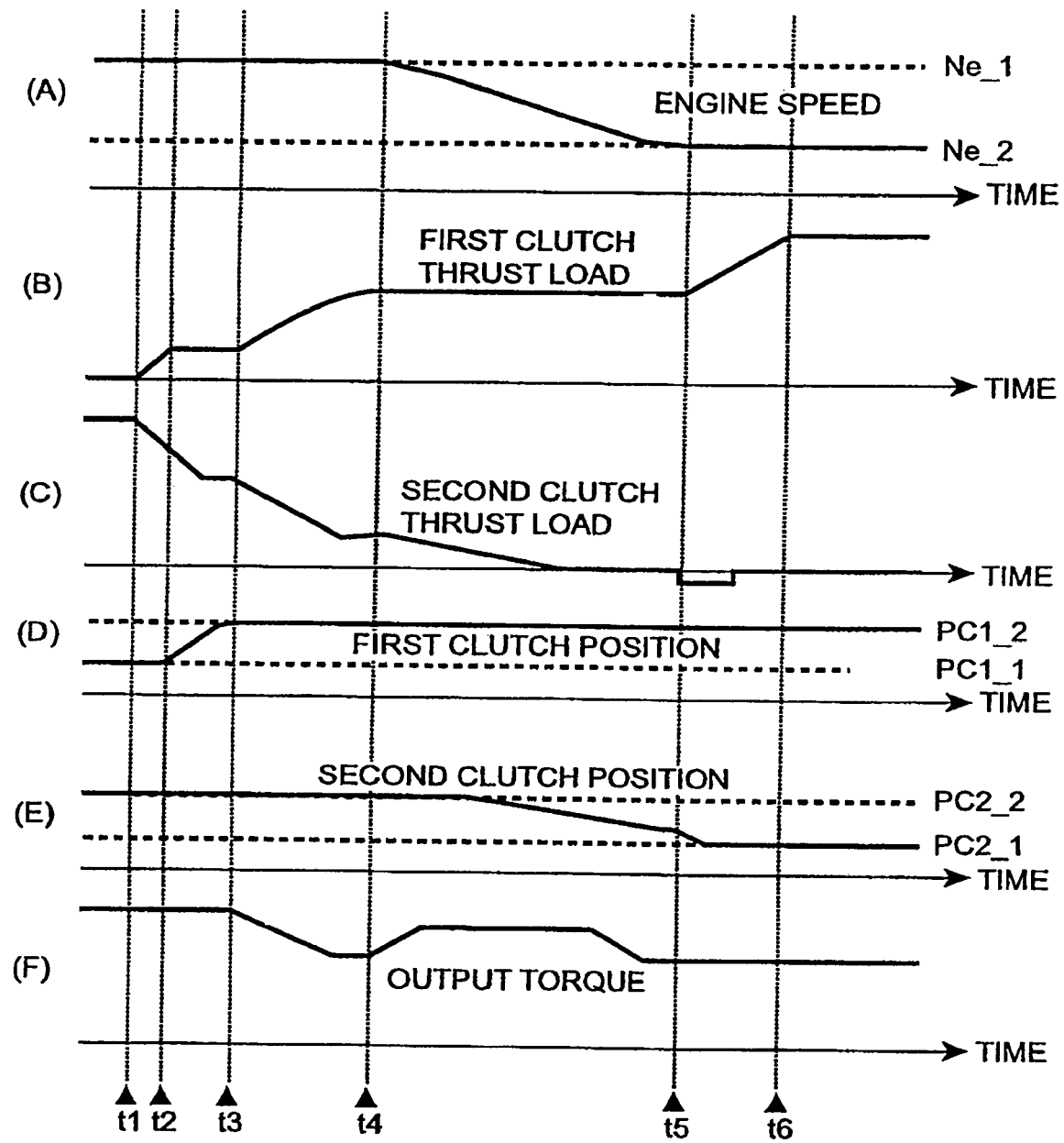

AUTOMATIC TRANSMISSION, CONTROL APPARATUS AND CONTROL SYSTEM

BACKGROUND OF THE INVENTION

The present invention relates to an automatic transmission, a control apparatus, and a control system, particularly to an automatic transmission which comprises an electric actuator in the automobile.

The automatic manual transmission in which the clutch and the gear change are automated by using a synchronous mesh type transmission for a manual transmission has been developed.

However, the sense of incompatibility is occasionally given to the driver because the driving torque is interrupted by disengagement/engagement operation of the clutch in the shift control in a conventional automatic manual transmission.

Then, the automatic transmission in which the assist clutch of the friction type that is the friction transfer mechanism is provided in the conventional automatic manual transmission is known (For instance, refer to patent document 1). Because the driving torque can be transferred with the assist clutch while shifting by controlling said assist clutch when shift, the driving torque interruption is evaded and a smooth shift is achieved according to this.

Moreover, the automatic transmission in which a oneway clutch and two friction clutches that are the friction transfer mechanism are provided in the conventional automatic manual transmission is known (For instance, refer to patent document 2). Because the driving torque can be transferred with the assist clutch while shifting by controlling said friction clutches when shift, the driving torque interruption is evaded and a smooth shift is achieved in this equipment.

Further, the automatic transmission in which the synchronization mechanism that is one form of the friction transfer mechanism is provided is known (For instance, refer to patent document 3). Because the driving torque can be transferred with the assist clutch while shifting by controlling said synchronization mechanism when shift, the driving torque interruption is evaded and a smooth shift is achieved in this equipment.

In the automobile equipped with such an automatic transmission, when the shifting is begun, the input torque to the transmission gear is transferred by said friction transfer mechanism. As a result, the rotating speed is controlled with the driving torque being transferred, the input shaft speed of the transmission gear is synchronized with the rotating speed corresponding to the next gear position, and thus the shifting is done.

In such an automatic manual transmission, a lot of actuators of hydraulic are adopted to operate said friction transfer mechanism. The hydraulic actuator has faults such as the variation of the response due to the temperature change etc. of oil and the restriction of installation etc. though it has the advantage that the configuration can be done cheaply. Then, to improve the response of the actuator of said friction transfer mechanism and the installation, the automatic transmission in which an electric actuator that comprises an electric motor is installed is known (For instance, refer to patent document 4).

[patent document 1] Japanese Patent No. 2,703,169
[patent document 2] Japanese Patent Application Laid-Open No. 63-83436
[patent document 3] Japanese Patent Application Laid-Open No. 2001-213201
[patent document 2] Japanese Patent Application Laid-Open No. 2002-22003

SUMMARY OF THE INVENTION

In said friction transfer mechanism, it is necessary to move the friction side to the position where the friction side can transfer the torque to transfer the torque by the friction side. However, an electric actuator has the possibility that shift quality deteriorates by occurring shock by the collision of the friction side of said friction transfer mechanism if the electric actuator is rapidly operated because the inertia by the movement or the rotation of the machine element including the electric motor is large compared with the hydraulic actuation device.

Then, in the present invention when the friction side is thrusted, the period which moves at moving speed lower than that when the friction side begins to move is provided from the time the friction side begins to move to the time the friction transfer mechanism begins to transfer the power.

BRIEF DESCRIPTION OF THE DRAWINGS

FIG. 19 is a timing chart of the example of the shift control.

DETAILED DESCRIPTION OF THE PREFERRED EMBODIMENT

Hereafter, embodiments of the present invention are explained in detail by using FIG. 1 to FIG. 19.

Figure 1:
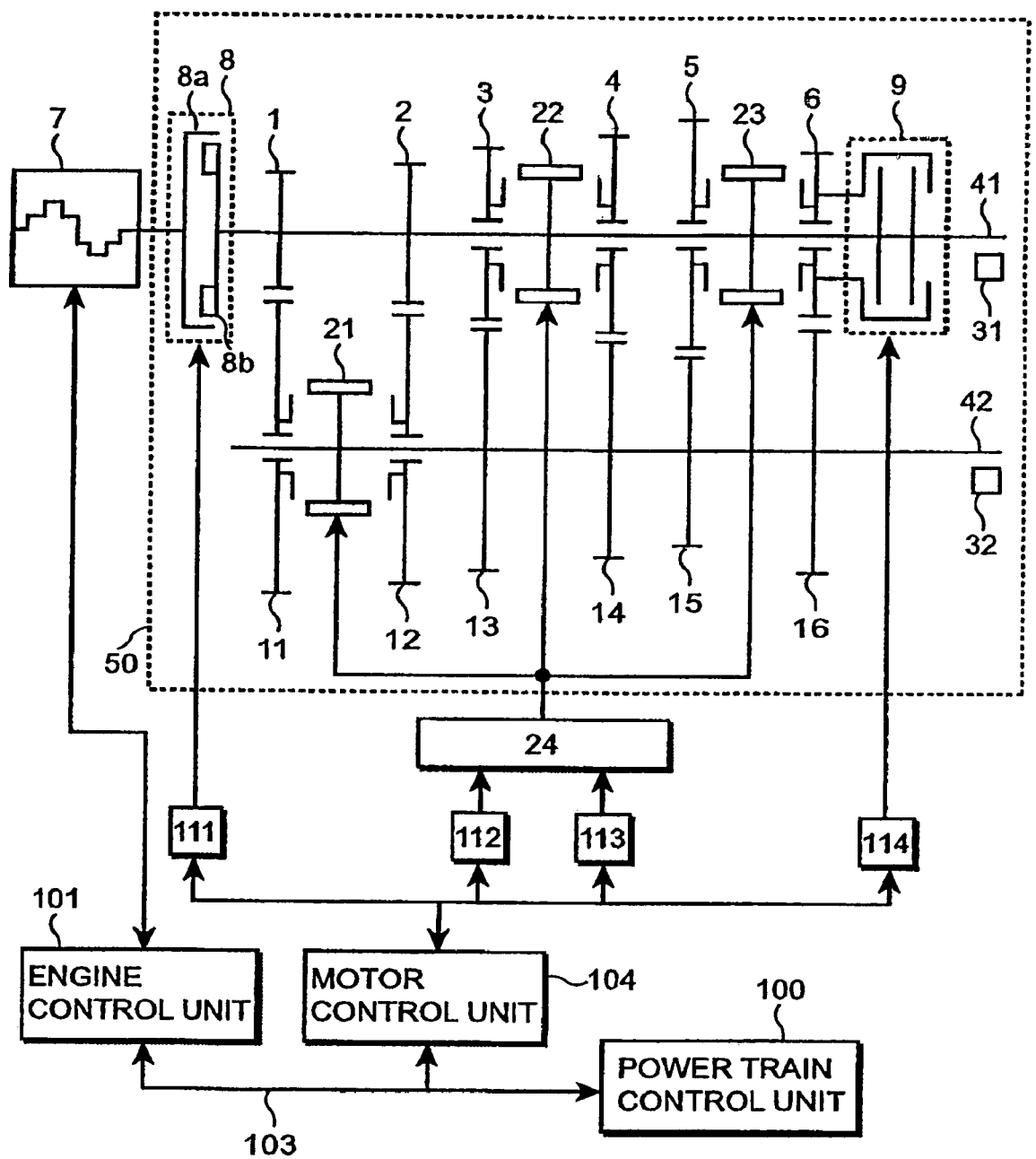
FIG. 1 is a skeleton view of the configuration of the automatic transmission and the control apparatus according to one embodiment of the present invention.

A first example of the configuration of the control apparatus for an automobile having the automatic transmission according to the present invention is explained by using FIG. 1.

FIG. 1 is a skeleton view of the system configuration example showing one embodiment of the control apparatus for an automobile having the automatic transmission according to the present invention.

There are provided engine 7 which is driving force source, engine speed sensor (not shown) which measures the rotating speed of engine 7, electronically controlled throttle (not shown) which adjusts the engine torque, fuel injector (not shown) which injects the amount of the fuel which corresponds to the intake air flow. The torque of engine 7 can be controlled in high accuracy by operating the intake air flow, the amount of the fuel, and the ignition timing, etc. by engine control unit 101. There is a cylinder injection method in which the fuel is injected directly to the cylinder or an intake port injection method in which the fuel is injected into the inlet port. Therefore, it is more advantageous to use the engine that can decrease the fuel consumption and can provide a good exhaust performance compared with the operating regions (area decided by the engine torque and the engine speed) demanded to the engines. Not only the gasoline engine but also the diesel engine, the natural gas engine, and the electric motor, etc. are acceptable as the driving force source.

Moreover, automatic transmission 50 is provided with input shaft clutch 8, assist clutch 9, transmission gear input shaft 41, transmission gear output shaft 42, first drive gear 1, second drive gear 2, third drive gear 3, fourth drive gear 4, fifth drive gear 5, sixth drive gear 6, first driven gear 11, second driven gear 12, third driven gear 13, fourth driven gear 14, fifth driven gear 15, sixth driven gear 16, first mesh type transfer mechanism 21, second mesh type transfer mechanism 22, third mesh type transfer mechanism 23, rotation sensor 31, and rotation sensor 32

Input shaft clutch input disks 8a is connected with said engine 7. The torque of said engine 7 can be transferred to or cut off from transmission gear input shaft 41 by engaging or disengaging input shaft clutch input disk 8a and input shaft clutch output disk 8b. Various kinds of clutches such as a multiplate disk wet type clutch and a single disk dry type clutch can be used though the single disk dry type clutch is used in general for input shaft clutch 8. Actuator 111 driven by the electric motor is used for the control of the thrust force (input shaft clutch torque) between said input shaft clutch input disk 8a and said input shaft clutch output disk 8b. The output of said engine 7 can be transferred to or intercepted from input shaft 41 by adjusting this thrust force (input shaft clutch torque).

First drive gear 1, second drive gear 2, third drive gear 3, fourth drive gear 4, fifth drive gear 5, and sixth drive gear 6 are provided to said input shaft 41. Said first drive gear 1 and said second drive gear 2 are fixed to transmission gear input shaft 41. Said third drive gear 3, said fourth drive gear 4, said fifth drive gear 5, and said sixth drive gear 6 are provided rotatably to transmission gear input shaft 41. Moreover, rotation sensor 31 is provided as a means for detecting the input shaft speed that is the rotating speed of said transmission gear input shaft 41.

On the other hand, first driven gear 11, second driven gear 12, third driven gear 13, fourth driven gear 14, fifth driven gear 15, and sixth driven gear 16 are provided to output shaft 42 of the transmission gear. First driven gear 11 and second driven gear 12 are provided rotatably to output shaft 42 of the transmission gear. Third driven gear 13, fourth driven gear 14, fifth driven gear 15, and sixth driven gear 16 are fixed to output shaft 42 of said transmission gear. Moreover, rotation sensor 32 is provided as a means for detecting the rotating speed of output shaft 42 of said transmission gear.

Said first drive gear 1 and said first driven gear 11, said second drive gear 2 and said second driven gear 12, said third drive gear 3 and said third driven gear 13, said fourth drive gear 4 and said fourth driven gear 14, said fifth drive gear 5 and said fifth driven gear 15, said sixth drive gear 6 and said sixth driven gear 16 are engaged, respectively.

Assist clutch 9 that is one system of the friction transfer mechanism is provided to input shaft 41. The torque of said engine 7 can be transferred to output shaft 42 of said transmission gear by controlling the transfer torque of said assist clutch 9.

Actuator 114 that is driven by the motor to control the transfer torque of said assist clutch 9, and the output of said engine 1 can be transferred to driving wheel sides by adjusting this transfer torque (assist clutch torque).

Here, said friction transfer mechanism is one that transfers the torque by generating the friction force based on the thrust force of the friction side. As a typical mechanism, there are a single plate dry type clutch, a multiplate disc dry type clutch, and a multiplate disc wet type clutch, etc. Even if all other friction transfer mechanisms are used, a similar result is obtained though the multiplate disc wet type clutch is assumed as an assist clutch in this embodiment.

Moreover, the first mesh type transfer mechanism 21 to connect first driven gear 11 with output shaft 42 of the transmission gear or to connect second driven gear 12 with output shaft 42 of the transmission gear is provided between the first driven gear 11 and second driven gear 12. Therefore, the rotating torque transferred from first drive gear 1 to the first driven gear 11 or from second drive gear 2 to the second driven gear 12 is transferred to output shaft 42 of the transmission gear through the first mesh type transfer mechanism 21.

Moreover, the second mesh type transfer mechanism 22 to connect third drive gear 3 with output shaft 41 of the transmission gear or to connect fourth drive gear 4 with input shaft 41 of the transmission gear is provided between third drive gear 3 and fourth drive gear 4. Therefore, the rotating torque transferred to the third drive gear 3 or the fourth drive gear 4 is transferred to third driven gear 13 or fourth driven gear 14 through the second mesh type transfer mechanism 22 and to output shaft 42 of the transmission gear.

Moreover, the third mesh type transfer mechanism 23 to connect fifth drive gear 5 with input shaft 41 of the transmission gear is provided to fifth drive gear 5. Therefore, the rotating torque transferred to the fifth drive gear 5 is transferred to fifth driven gear 15 through the third mesh type transfer mechanism 23 and to output shaft 42 of the transmission gear.

Even if a synchronous mesh type mechanism is used, in which the friction transfer mechanism is provided to engage by thrusting the friction side and synchronizing the rotating speed, a similar result can be obtained although a constant mesh type mechanism is used here as said mesh type transfer mechanism 21, 22, and 23.

Thus, to transfer the rotating torque of transmission gear input shaft 41 to output shaft 42 of the transmission gear, it is necessary to move any one of first mesh type transfer mechanism 21, second mesh type transfer mechanism 22 and third mesh type transfer mechanism 23 in an axial direction of input shaft 41 of the transmission gear or output shaft 42 of the transmission gear, and to engage any one of first driven gear 11, second driven gear 12, third driven gear 13, fourth drive gear 14 and fifth drive gear 5.

Shift/selection mechanism 24 is operated by selection actuator 113, and the mesh type transfer mechanism which should be moved is selected from among first mesh type transfer mechanism 21, second mesh type transfer mechanism 22 and third mesh type transfer mechanism 23. Any one of first driven gear 11, second driven gear 12, third driven gear 13, fourth drive gear 14 and fifth drive gear 15 is engaged by moving the position of one selected mesh type transfer mechanism by using shift actuator 112. As a result, rotating torques of transmission gear input shaft 41 is transferred to output shaft 42 of the transmission gear through any one of first mesh type transfer mechanism 21, second mesh type transfer mechanism 22 and third mesh type transfer mechanism 23.

The rotating torque of transmission gear input shaft 41 transferred to output shaft 42 of the transmission gear from first drive gear 1, second drive gear 2, third drive gear 3, fourth drive gear 4, fifth drive gear 5 and 6th drive gear 6 through first driven gear 11, second driven gear 12, third driven gear 13, fourth driven gear 14, fifth driven gear 15 and the 6th driven gear 16 is transferred to an axle (not shown) through a differentiation gear (not shown) connected with output shaft 42 of the transmission gear.

The transfer torque of input shaft clutch actuator 111 which controls the transfer torque of said input shaft clutch 8 and/or assist clutch actuator 114 which controls the transfer torque of said assist clutch 9 is controlled by changing the electric current of motor (not shown) provided to each actuator by motor control unit 104. Said input shaft clutch actuator 111 comprises a motor and a mechanical part which converts the rotary motion of the motor into the linear motion. That is, it comprises parts such as a warm gear, arms, and the ball screws.

Moreover, the selection position is controlled by changing the electric current of the motor (not shown) provided to selection actuator 113 by motor control unit 104. That is, the stroke position of selection lever (not shown) which selects which mesh type transfer mechanism to be operated from among first mesh type transfer mechanism 21, second mesh type transfer mechanism 22 and third mesh type transfer mechanism 23 is controlled.

Moreover, the shift position, that is, the stroke position or the load of the selected mesh type transfer mechanism is controlled by changing the electric current of motor (not shown) provided to shift actuator 112 by motor control unit 104.

The selection position is controlled by selection actuator 113, and the movement of first mesh type transfer mechanism 21 is selected. The shift position is controlled by shift actuator 112, and the first mesh type transfer mechanism 21 and the first driven gear 11 are engaged with each other to set up the first gear.

The selection position is controlled by selection actuator 113, and the movement of first mesh type transfer mechanism 21 is selected. The shift position is controlled by shift actuator 112, and the first mesh type transfer mechanism 21 and the second driven gear 12 are engaged with each other to set up the second gear.

The selection position is controlled by selection actuator 113, and the movement of second mesh type transfer mechanism 22 is selected. The shift position is controlled by shift actuator 112, and the second mesh type transfer mechanism 22 and the fourth drive gear 4 are engaged with each other to set up the fourth gear.

The selection position is controlled by selection actuator 113, and the movement of second mesh type transfer mechanism 22 is selected. The shift position is controlled by shift actuator 112, and the second mesh type transfer mechanism 22 and the third drive gear 3 are engaged with each other to set up the third gear.

The selection position is controlled by selection actuator 113, and the movement of third mesh type transfer mechanism 22 is selected. The shift position is controlled by shift actuator 112, and the third mesh type transfer mechanism 22 and the fifth drive gear 5 are engaged with each other to set up the fifth gear.

Shift/selection mechanism 24 which operates first mesh type transfer mechanism 21, second mesh type transfer mechanism 22 and third mesh type transfer mechanism 23 can comprise a selection lever, a shift fork, etc. Moreover, other mechanisms to move mesh type transfer mechanisms 21, 22, and 23 like the drum type etc. can be used.

Moreover, the torque of engine 7 is controlled in high accuracy by operating the intake air flow, the amount of the fuel, and the ignition time, etc. by engine control unit 101.

And, said motor control unit 104 and said engine control unit 101 are controlled by power train control unit 100. Said power train control unit 100, engine control unit 101, and motor control unit 104 transmit and receive information mutually by communication means 103.

In this example, the reduction gear ratio of said sixth drive gear and said sixth driven gear, to which the assist clutch which is one method of the friction transfer mechanism are connected, is set between the reduction gear ratio at the third gear position set up by third drive gear 3 and third driven gear 13 and the reduction gear ratio at the fourth gear position set up by fourth drive gears 4 and fourth driven gears 14. However, the reduction gear ratio between the fourth gear position and the fifth gear position can be used as said reduction gear ratio. Moreover, the reduction gear ratio corresponding to the third gear position, the fourth gear position, or the top gear position can be used. Moreover, it is also possible to set up the friction transfer mechanism instead of the mesh type transfer mechanism provided as the fixed gear position by using it as an alternative mechanism of fifth drive gear 5, fifth driven gear 15 and the alternative of the third mesh type transfer mechanism. It is also possible to apply to two or more gear positions by using a plurality of friction transfer mechanisms.

Thus, it is applicable in various transmissions which have at least one friction transfer mechanism between the input shaft and the output shaft of said transmission gear.

Figure 2:
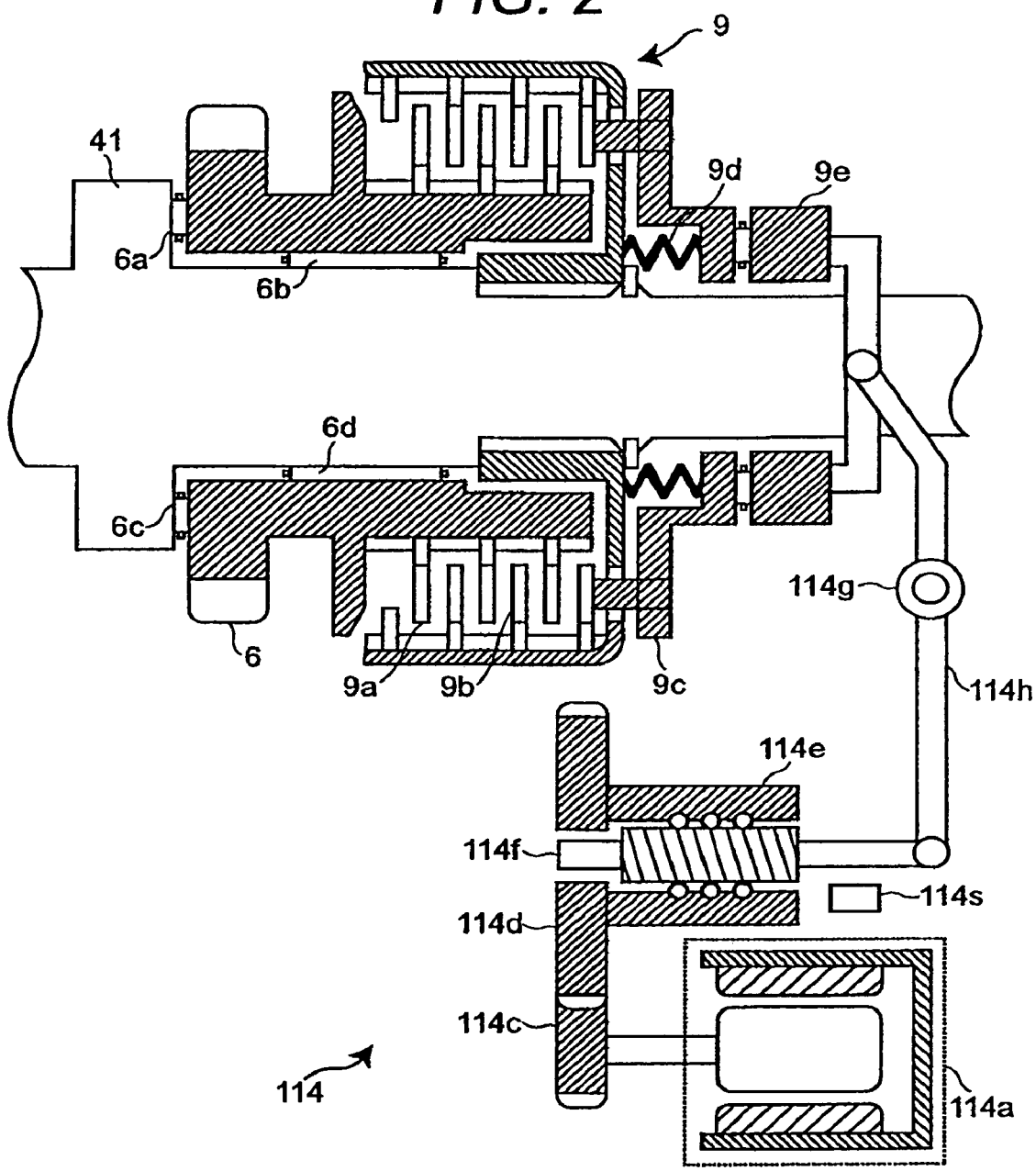
FIG. 2 is an enlarged section view of the electric actuator of FIG. 1.

FIG. 2 shows a first example of the configuration of an electric actuator according to one embodiment of the electric actuator (assist clutch 9 and assist clutch actuator 114). FIG. 2 is a cross section where the part of assist clutch 9, transmission gear input shaft 41, sixth drive gear 6 and assist clutch actuator 114 in FIG. 1 is expanded.

There are provided bearings 6a, 6b, 6c and 6d between input shaft 41 and sixth drive gear 6 shown in FIG. 2, and the rotation of input shaft 41 and the sixth drive gear 6 is provided rotatably with each other.

Assist motor 114a is provided to assist clutch actuator 114 shown in FIG. 2. The rotating torque generated by assist motor 114a is transferred to ball screw 114e through motor drive gear 114c and motor driven gear 114d. Rod 114f is stroked with the rotation of ball screw 114a, arm 114h is actuated about link 114g by the stroke of rod 114f, and pressure ring 9e is thrusted. As a result, slider 9c is thrusted, return spring 9d is compressed, the thrust force is provided between drive plate 9b and driven plate 9a, and the rotating torque of input shaft 41 is transferred to sixth drive gear 6. Moreover, stroke sensor 114s which detects the stroke of rod 114f is provided. The stroke of assist clutch 9, that is, the stroke of slider 9 is calculated from the stroke of rod 114f.

Here, a method to detect the rotation of motor 114a or motor drive gear 114c for instance can be used for the detection of the stroke of assist clutch 9. Moreover, a mechanism where the link mechanism is provided to arm 114h can be used. The detection device can be arranged at any positions where the stroke of assist clutch 9 can be detected.

Here, a so-called direct current motor where the magnet is fixed and the coil is rotated may be acceptable for assist motor 114a. A so-called permanent magnet synchronous motor where the coil is fixed and the magnet is rotated may be acceptable for assist motor 114a. Various motors are applicable as assist motor 114a.

Figure 3:
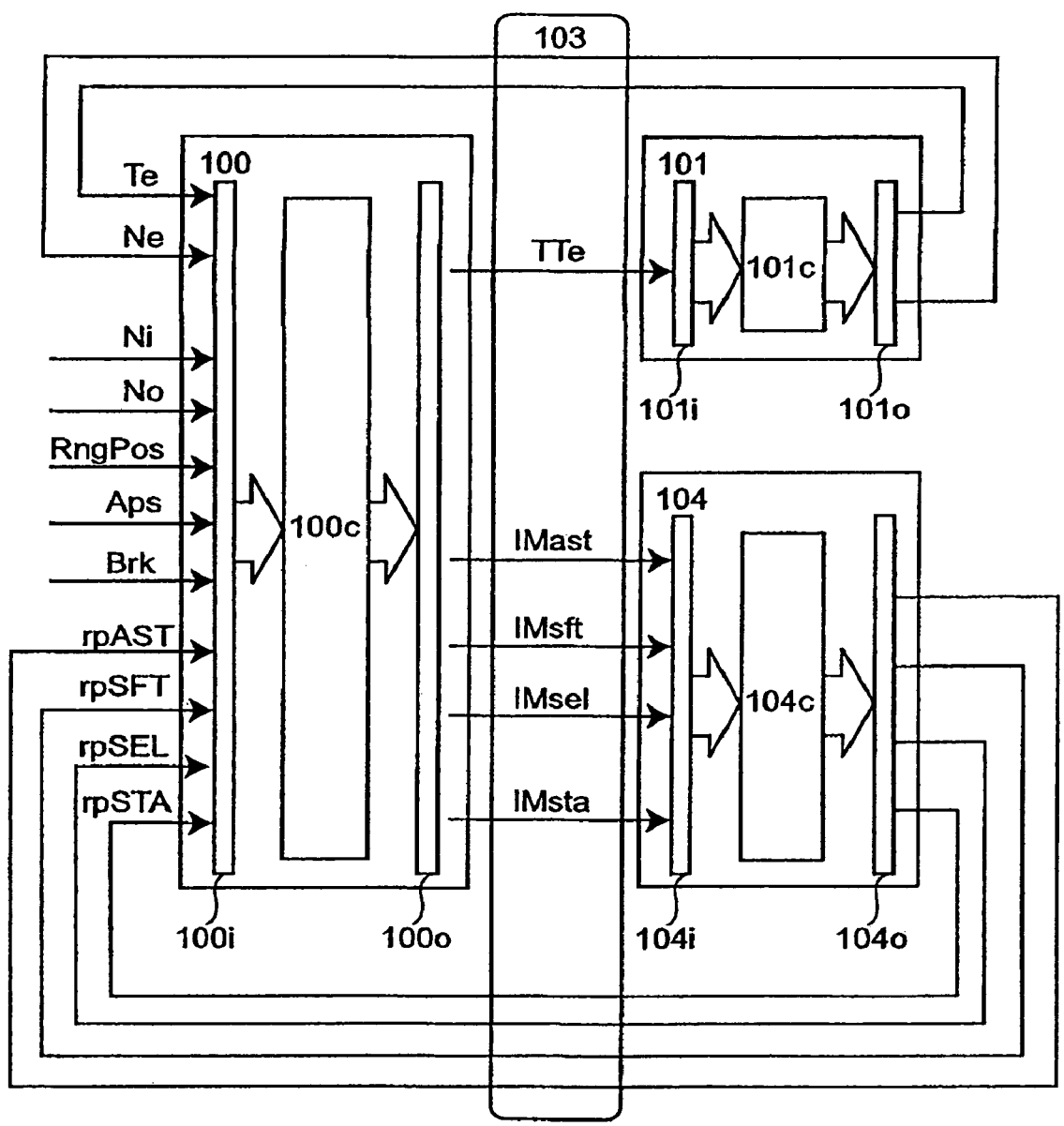
FIG. 3 is a block diagram showing I/O signals between power train control unit 100, engine control unit 101, and motor control unit 104 used for the control apparatus of FIG. 1.

FIG. 3 shows the relation of the I/O signal between power train control unit 100, engine control unit 101, and motor control unit 104. Power train control unit 100 is set up as a control unit having input portion 100i, output portion 100o, and computer 100c. Similarly, engine control unit 101 is set up as a control unit having input portion 101i, output portion 101o, and computer 101c. Further, motor control unit 104 is set up as a control unit having input portion 104i, output portion 104o, and computer 104c.

Engine torque instruction value TTe is transferred by using communication method 103 from power train control unit 100 for engine control unit 101. To achieve TTe, engine control unit 101 controls the intake air flow, the amount of the fuel, and the ignition time etc. of said engine 7. Moreover, a means (not shown) for detecting the engine torque which becomes an input torque of the transmission is provided in engine control unit 101. Engine control unit 101 detects rotating speed Ne of engine 7 and engine torque Te generated by engine 7, and transmit the result to power train control unit 10 by using communication means 103. The torque sensor is used as an engine torque detection means. Or, a presumption means which uses engine parameters such as the injection pulse width in the injector, the pressure in the intake pipe, and the engine speed, etc. can be used as an engine torque detection means.

The following signals are transmitted from power train control unit 100 to motor control unit 104. Namely, assist clutch motor target electric current IMast to achieve the desired assist clutch transfer torque, shift motor target electric current IMast to achieve the desired shift load and shift position, selection motor target electric current IMsel to achieve the desired selection position, input shaft clutch motor target electric current IMsta to achieve the desired input shaft clutch transfer torque.

Motor control unit 104 adjusts the voltage applied to the motor of assist clutch actuator 114 to achieve assist clutch motor target electric current IMast, controls the motor electric current, and engages or disengages assist clutch 9. Moreover, motor control unit 104 adjusts the voltage applied to the motor of shift actuator 112 to achieve shift motor target electric current IMsft, and controls the motor electric current. Moreover, the voltage applied to the motor of selection actuator 113 is adjusted to achieve selection motor target electric current IMsel, and the motor electric current is controlled. Thereby, the shift position and the selection position are controlled by operating shift/selection mechanism 24. As a result, first mesh type transfer mechanism 21, second mesh type transfer mechanism 22 and third mesh type transfer mechanism 23 are engaged or disengaged with each other.

Moreover, motor control unit 104 adjusts the voltage applied to the motor of input shaft clutch actuator 111 to achieve input shaft clutch motor target electric current IMsta, controls the motor electric current, and engages or disengages input shaft clutch 8.

Moreover, motor control unit 104 detects assist clutch position signal rpAST indicative of the position of assist clutch, selection position signal rpSEL indicative of the stroke of selection lever used to select either from among first mesh type transfer mechanism 21, second mesh type transfer mechanism 22 and third mesh type transfer mechanism 23, shift position signal rpSFT indicative of the stroke of shift fork which operates first mesh type transfer mechanism 21, second mesh type transfer mechanism 22 and third mesh type transfer mechanism 23, and input shaft clutch position signal rpSTA indicative of the position of input shaft clutch, and transmits their detection signals to power train control unit 100.

Input shaft speed Ni and output shaft speed No are input from the rotation sensor 31 and rotation sensor 32, respectively, to power train control unit 100. Further, range position signal RngPos indicative of the shift lever position such as P range, R range, N range, and D range, accelerator pedal position Aps, and ON/OFF signal Brk from brake switches which detect whether the brake being depressed are input to power train control unit 100.

When the driver makes the shift range D range etc. for instance and depresss the acceleration pedal, it is judged in power train control unit 100 that the driver has an intention of starting or accelerating the car. Moreover, when the driver depresses the brake pedal, it is judged in unit 100 that the driver has an intention of decelerating or stopping the car. And, to achieve driver's intention, unit 100 sets engine torque instruction value TTe, assist clutch motor target electric current IMast, shift motor target electric current IMsft, selection motor target electric current IMsel, and input shaft clutch motor target electric current IMsta. Moreover, unit 100 sets the target gear position from accelerator pedal position Aps and car speed Vsp calculated from output shaft speed No. And, to execute the shift operation to the gear position set, unit 100 sets engine torque instruction value TTe, assist clutch motor target electric current IMast, shift motor target electric current IMsft, selection motor target electric current IMsel, and input shaft clutch motor target electric current IMsta.

Next, the content of the shift control by the control apparatus of the automatic transmission having the electric actuator according to this embodiment is explained by using FIG. 4-FIG. 8.

The content of the shift control is programmed in advance to computer 100c of power train control unit 100, and executed repeatedly at a fixed cycle. That is, the processing in FIG. 4, FIG. 5 and FIG. 6 is executed repeatedly at a fixed cycle in power train control unit 100.

Figure 4:
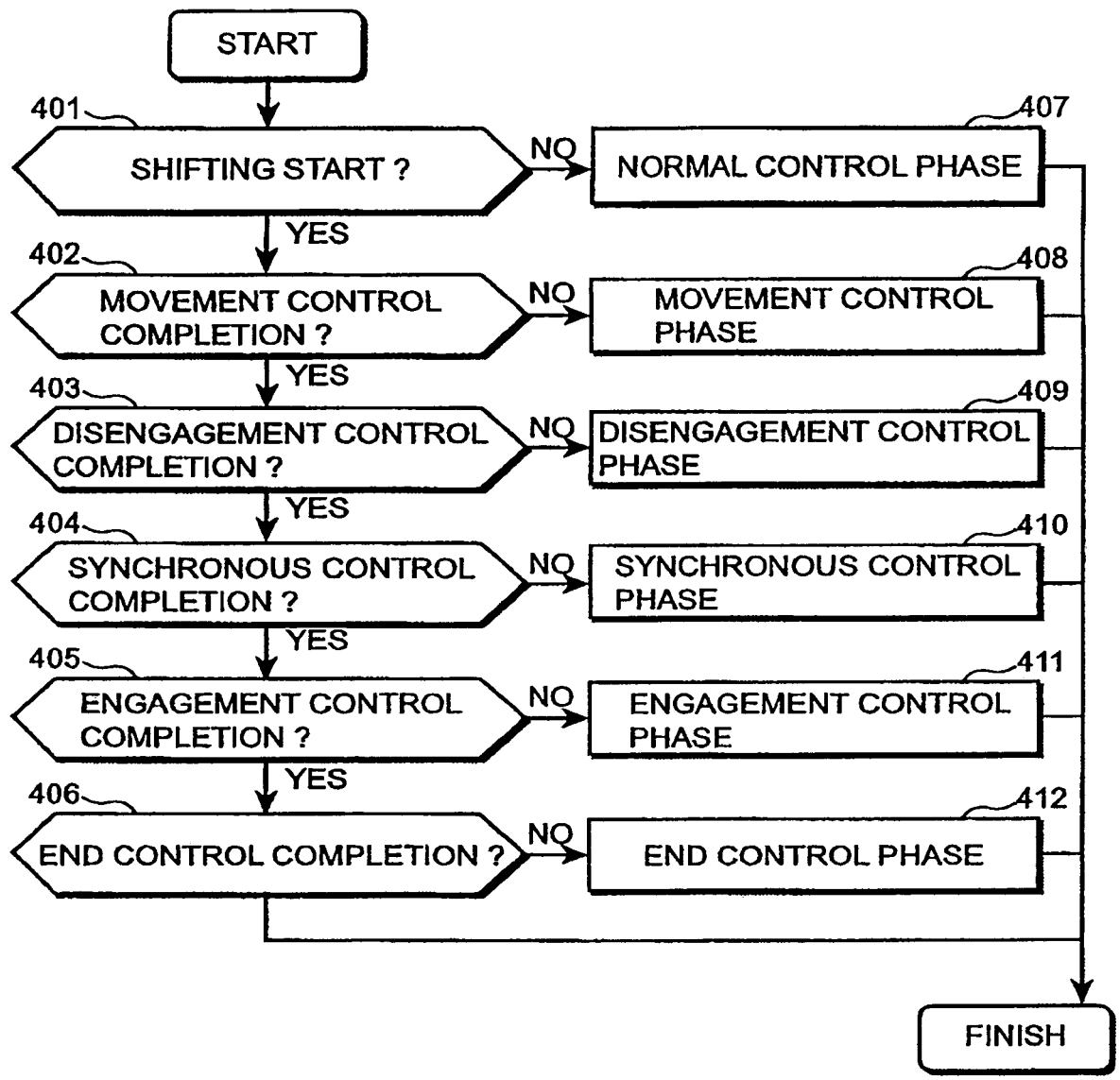
FIG. 4 is an outline flow chart of the entire control apparatus of FIG. 1.

FIG. 4 is a flow chart showing the content of the shift control and the procedure by which the phase of the shift control done in the control apparatus for an automobile according to the embodiment of the present invention is judged.

The target gear position is set from car speed Vsp and accelerator pedal position Aps in step 401 (shifting start judgment). It is judged the shifting start when the present gear position and the set gear position are different, and the processing advances to step 402. It is judged that it is not necessary to shift when the present gear position and the set gear position are the same, and the processing advances to step 407 (normal control phase). After step 407 is executed, the processing is ended. In step 407(normal control phase), engine torque instruction value TTe, assist clutch motor target electric current IMast, shift motor target electric current IM sft, selection motor target electric current IMsel, and input shaft clutch motor target electric current IMsta are set to achieve driver's intention.

Figure 5:
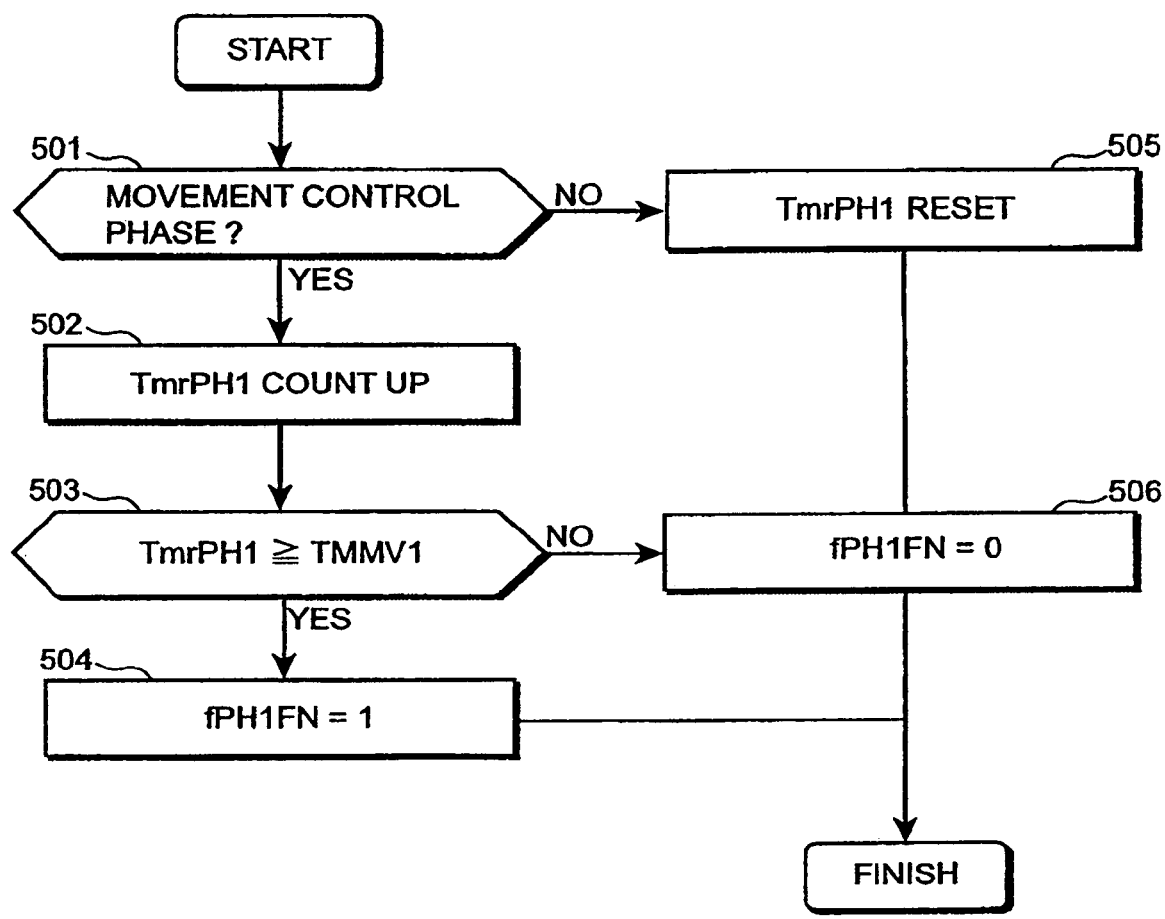
FIG. 5 is a flow chart of the movement completion judgment processing of FIG. 4.
Figure 6:
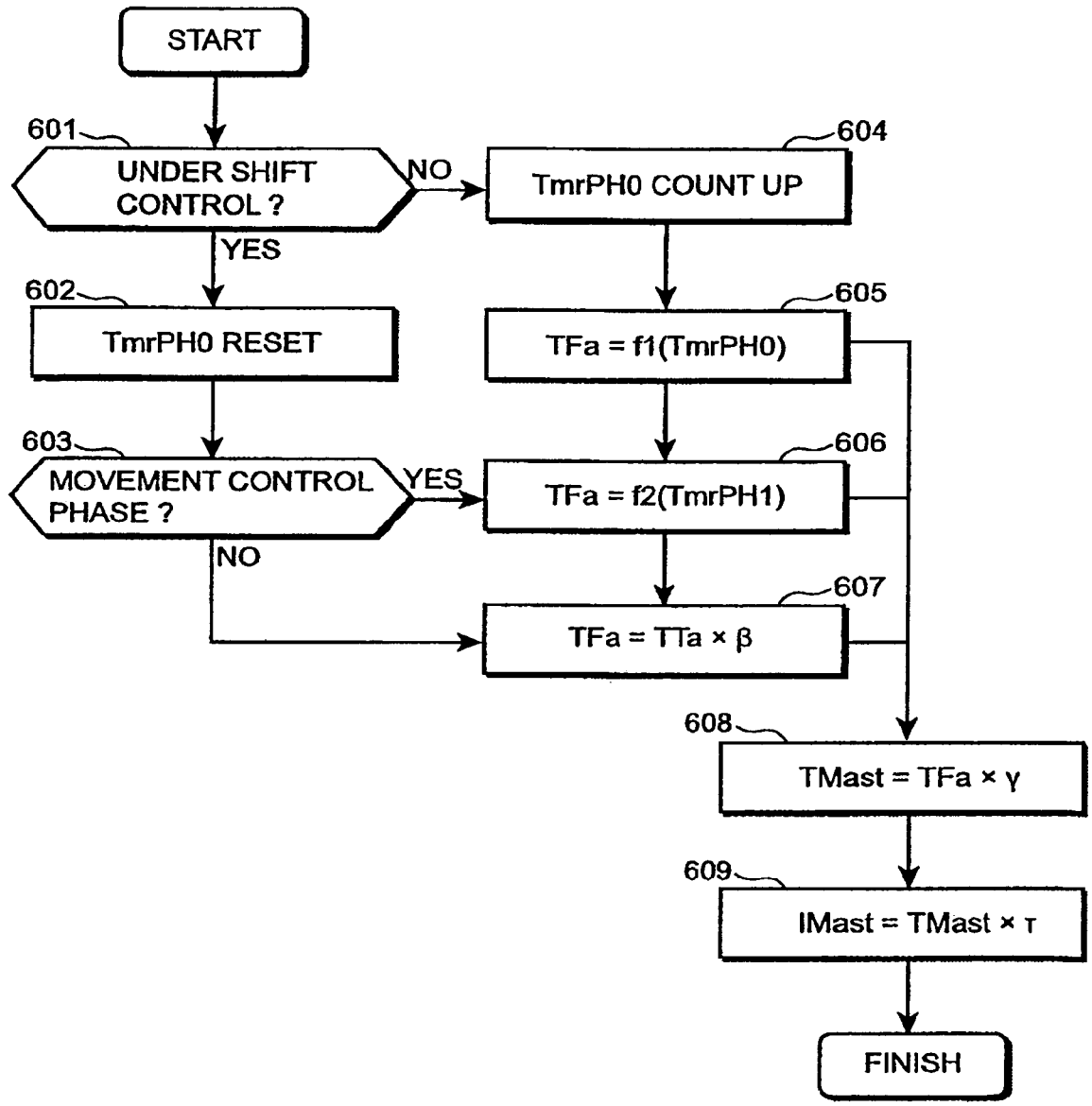
FIG. 6 is a flow chart of the assist motor torque operation processing of FIG. 4.

In step 402(movement control completion judgment), it is judged whether the movement control has completed by using movement completion judgment flag fPH1FN set in FIG. 5. The processing advances to step 403 at the movement control completion. The processing advances to step 408 for non-completion. After step 408 is executed, the processing is ended. In step 408(movement control phase), to execute the movement control to move the assist clutch to the torque transmission position, assist clutch motor target electric current IMast is set.

In step 408(disengagement control completion judgment), it is judged whether the disengagement control has completed. The processing advances to step 404 at the disengagement control completion. The processing advances to step 409 (disengagement control phase) if not completed, and step 409 is executed. In step 409 (disengagement control phase), assist clutch motor target electric current IMast and shift motor target electric current IMsft are set to execute the disengagement control to disengage the gear. Here, in step 403, it is judged whether shift position rpSFT is at a position which can be judged to be at the disengagement position. When the threshold to judge the disengagement position is assumed to be SF1OFF and SF3OFF, it is assumed SF1OFF≧rpSFT≧SF3OFF. Here, it is preferable to make SF1OFF and SF3OFF in a wide range from among the positions where first transfer mechanism 21, second mesh type transfer mechanism 22 and third mesh type transfer mechanism 23 become disengagement. Moreover, the judgment of step 403 can be used to judge that shift position rpSFT has moved to the disengagement position.

In step 404 (synchronous control completion judgment), it is judged whether the synchronous control has completed. The processing advance s to step 405 at the synchronous control completion. The processing advances to step 410 (synchronous control phase), if not completed. After step 410 is executed, the processing is ended. In step 410 (synchronous control phase), engine torque instruction value TTe, assist clutch motor target electric current IMast, shift motor target electric current IMsft, and selection motor target electric current IMsel are set to execute the synchronous control for the input rotating speed to be synchronized with the rotating speed corresponding to the next gear position (the target rotating speed). The judgment of step 404 is made here in case that the difference between the rotating speed (the target rotating speed) of the next gear position and the input rotating speed becomes small (|input rotating speed Ni−output rotating speed No ×target gear position reduction gear ratio γ nl is small.) and the selection position is at the target position. It is preferable to provide the time delay to both conditions of the rotation difference and the selection position for the judgment.

It is judged whether the engagement control has completed in step 405 (engagement control completion judgment). The processing advances to step 406 at the engagement control completion. The processing advances to step 411 (engagement control phase), if not completed. After step 411 is executed, the processing is ended. Engine torque instruction value TTe, assist clutch motor target electric current IMast, shift motor target electric current IMsft, and selection motor target electric current IMsel are set to execute the engagement control to engage the gear in step 411 (engagement control phase). When the shift position is in the target position, the judgment in step 405 is made. In the judgment of the shift position, for example, from second gear to third gear, when rpSFT≧SF3, where the SF3 is a threshold value, it is judged that the third gear is engaged.

It is judged whether the end control has completed in step 406 (end control completion judgment). The Processing is ended at the end control completion. The processing advances to step 412, if not completed. After step 412 is executed, the processing is ended. Engine torque instruction value TTe, assist clutch motor target electric current IMast, shift motor target electric current IMsft, and selection motor target electric current IMsel are set to execute the end control to assume the assist clutch torque to be gradually 0 (zero) in step 412 (end control phase). When the assist clutch target torque is 0(zero), the judgment in step 406 is made.

Thus, the content of the shift control shown in FIG. 4 is programmed in computer 100c of power train control unit 100, and either of step 407, 408, 409, 410, 411 or 412 is executed repeatedly at a fixed cycle.

Next, the content of the processing of movement completion judgment flag fPH1FN used to judge the movement completion in step 402(movement control completion judgment) is explained by using FIG. 5.

It is judged whether the processing is in a movement control phase in step 501. Movement control phase timer Tm rPH1 is counted up in step 502 if the processing is in the movement control phase, and the processing advances to step 503 afterwards. The processing advances to step 505 if not in the movement control phase. After movement control phase timer TmrPH1 is reset, the processing advances to step 506.

It is judged whether movement control phase timer TmrPH1 is movement time required TMMV1 or more in step 503. The processing advances to step 504 if TmrPH1 is movement time required TMMV1 or more. And, the movement completion judgment flag is set in fPH1FN=1 (movement completion), and the processing is ended. The processing advances to step 506 if TmrPH1 is less than movement time required TMMV1. And, the movement completion judgment flag is set in fPH1FN=0 (movement non-completion), and the processing is ended.

Here, it is preferable to use the measuring time as movement time required TMMV1 by measuring in advance the time required until return spring 9d of FIG. 2 is compressed by fixed assist clutch motor target electric current IMast, and thrust force is generated between drive plate 9b and driven plate 9a.

Moreover, when there is no return spring 9d, it is preferable to use the measuring time as movement time required TMMV1 by measuring the time required until the movement resistance of the sliding resistance etc. when drive plate 9b is moved to the position where thrust force is generated between driven plates 9a and drive plate 9a is overcome beforehand.

Next, the content of the calculation processing of the target electric current of the assist clutch motor executed in step 407, 408, 409, 410, 411 and 412 of FIG. 4 is explained by using FIG. 6.

It is judged whether the processing is under the shift control in step 601. If under the shift control, normal control phase timer TmrPH0 is reset in step 602. Afterwards, the processing advances to step 603. The processing advances to step 604 if not under shift control. After normal control phase timer TmrPH0 is counted up, the processing advances to step 605. Target thrust load TFa of assist clutch actuator 114 is set in step 605 so that the assist clutch may be at a disengagement position by a function f1 which inputs normal control phase timer TmrPH0. Here, the function f1 is set so that target thrust load TFa of assist clutch actuator 114 may become 0 (zero) when normal control phase timer TmrPH0 increases.

It is judged whether it is a movement control phase in step 603. The processing advances to step 606 if so. The processing advances to step 607 if it is not a movement control phase. In step 606, target thrust load TFa of assist clutch actuator 114 is set based on function f2 which inputs movement control phase timer TmrPH1 so that the state just before the thrust force is generated between drive plate 9b and driven plate 9a may be obtained by stroking rod 114f in FIG. 2 and compressing return spring 9d. Here, function f2 is set so that target thrust load TFa may be increased up to the load necessary to compress return spring 9d by stroking rod 114f of FIG. 2 when movement control phase timer TmrPH1 increases. Further, when there is no return spring 9d, the load necessary to overcome the movement resistance of a sliding resistance etc. when drive plate 9b is moved to the position where thrust force is generated between driven plate 9a and drive plate 9b is set. In step 607, target assist clutch torque TTa to execute the shift operation to the target gear position is converted into target thrust load TFa by conversion coefficient β, where, the conversion coefficient β is set from a friction coefficient of assist clutch 9, a friction side effective radius, and the number of friction sides.

Target thrust load TFa of the assist clutch is converted into target torque TMast of the assist clutch motor by conversion coefficient γ in step 608, where, the conversion coefficient γ is set from the lead of the ball screw in FIG. 2, the reduction ear ratio, and the efficiency of the gear etc.

Target torque TMast of the assist clutch motor is converted into target electric current IMast of the assist clutch motor by conversion coefficient τ in step 609, where, the conversion coefficient τ is set based on an amount of the magnetic flux of the magnetic field which interlinks with coils of assist clutch motor.

Figure 7:
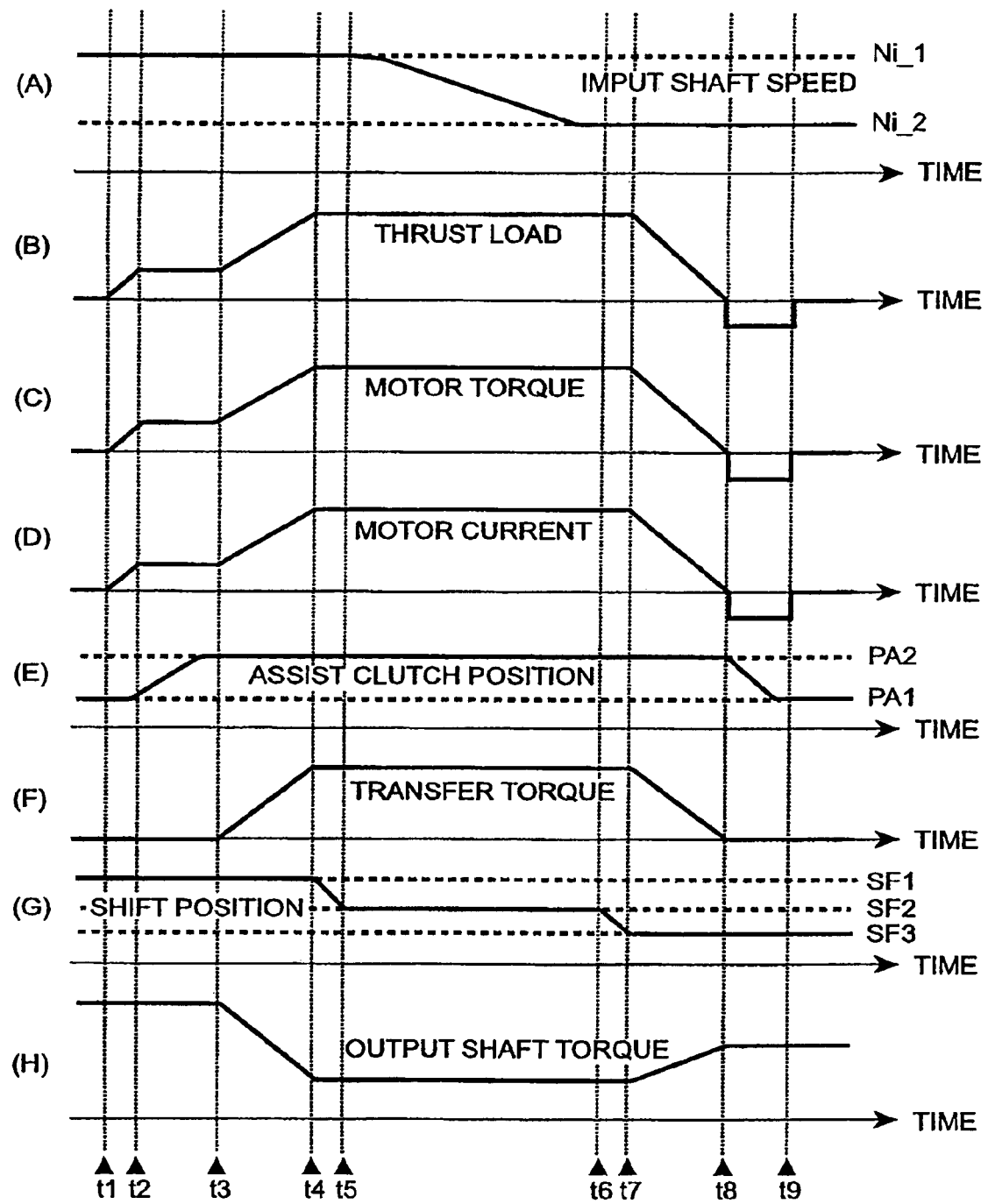
FIG. 7 is a timing chart of the example of a first shift control in the control apparatus of FIG. 1.

Next, an example of the first shift control configured as shown from FIG. 4 to FIG. 6 is explained by using FIG. 7. The example of this first shift control illustrates the content of the control at upshift from the first gear to the second gear.

FIG. 7 is a timing chart showing an example of a first shift control of the automatic transmission having an electric actuator according to one embodiment of the present invention.

In FIG. 7, the period from time t1 to time t3 is a movement control phase (step 408 of FIG. 4), the period from time t3 to time t5 is a disengagement control phase (step 409 of FIG. 4), the period from time t5 to time t6 is a synchronous control phase (step 410 of FIG. 4), the period from time t6 to time t7 is a engagement control phase (step 411 of FIG. 4), the period from time t7 to time t8 is an end control phase (step 412 of FIG. 4), and the time period since time t8 is a normal control phase (step 407 of FIG. 4).

In FIG. 7, FIG. 7(A) shows input shaft speed Ni. Ni_1 is a rotating speed corresponding to the first gear position, and Ni_2 is a rotating speed corresponding to the second gear position. FIG. 7(B) shows the thrust load of assist clutch actuator 114. FIG. 7(C) shows the torque of assist motor 114a. FIG. 7(D) shows the electric current of assist motor 114a. FIG. 7(E) shows assist clutch position rpAST. FIG. 7(F) shows the transfer torque of assist clutch 9. FIG. 7(G) shows shift position rpSFT. FIG. 7(H) shows the torque of output shaft 42 of the transmission gear.

In the sign code of each signal of the thrust load of assist clutch actuator 114 of FIG. 7(B), the torque of assist motor 114a of FIG. 7(C), the electric current of assist motor 114a of FIG. 7(D), the plus sign indicates the direction where assist clutch 9 is engaged, and the minus sign indicates the direction where assist clutch 9 is disengaged.

In FIG. 7, function f1 in step 605 of FIG. 6 is set so that target thrust load TFa of the assist clutch may reach a constant value until normal control phase timer TmrPH0 reaches a fixed value. Moreover, function f1 is set so that target thrust load TFa of the assist clutch may become 0 when normal control phase timer TmrPH0 is more than a fixed value. Moreover, target thrust load TFa of the assist clutch increases gradually until movement control phase timer TmrPH1 reaches a fixed value, and function f2 in step 60 of FIG. 6 is set so that target thrust load TFa of the assist clutch may become constant when movement control phase timer TmrPH1 is more than a fixed value.

Shift position rpSFT before time t1 is SF1 in "first gear side" as shown in FIG. 7(G), and the first gear has been kept. At this time, input shaft speed Ni is rotating speed Ni_1 corresponding to the first gear as shown in FIG. 7(A).

In the judgment processing in step 401 of FIG. 4, the shifting is started when judged the shift starting. Here, the shifting is begun at time t1. The assist clutch moves to the torque transmission position in the movement control phase (step 408 of FIG. 4) when the shifting is begun at time t1.

Target thrust load TFa of assist clutch actuator 114 is constantly increased from time t1 to time t2 according to function f2 set in step 606 of FIG. 6 because it is judged the movement control phase in step 603 of FIG. 6. Target torque TMast of the assist clutch motor is calculated in step 608 based on this target thrust load TFa. In addition, target electric current IMast of the assist clutch motor is calculated in step 609. The applied voltage to assist motor 114a is adjusted to achieve target electric current IMast of assist motor 114a with motor control unit 104, and the electric current of assist motor 114a is controlled. As a result, assist motor electric current (D) is increased, assist motor torque (C) is also increased, and thrust load (B) of the assist clutch actuator is increased.

Target thrust load TFa of assist clutch actuator 114 is set to a constant value from time t2 to time t3 according to function f2 set in step 606 of FIG. 6. Accordingly, assist motor electric current (D), assist motor torque (C), and thrust load (B) of the assist clutch actuator are kept constant values. As a result, assist clutch position (E) moves from disengagement position PA1 to torque transmission position PA2 at the speed where the collision shock of driven plate 9a and drive plate 9b of assist clutch 9 is not occurred. At this time, anti-power to thrust load (B) of assist clutch actuator 114 increases because return spring 9d is compressed along with the movement of assist clutch position (E). As a result, assist clutch position (E) moves to torque transmission position PA2 as with assist clutch position (E) being gradually decreased the moving speed.

Movement control phase timer TmrPH1 is counted up in step 502. At time t3 judged that movement control phase timer TmrPH1 becomes more than the movement time required TMMV1 which is the time enough for assist clutch position (E) to move from disengagement position PA1 to torque transmission position PA2 in step 503, movement completion judgment flag fPH1FN=1 (movement completion) is set in step 504. It is judged the movement control completion in step 402 of FIG. 4, and a disengagement control phase is begun (Step 409 of FIG. 4).

In the disengagement control phase, target thrust load Tfa of assist clutch actuator 114=target assist clutch torque TTa×conversion coefficient β is set to achieve target assist clutch torque Tta based on step 607 of FIG. 6. As a result, thrust load (B) of the assist clutch actuator increases further, shift position (G) moves from engagement position SF1 of the first gear side to neutral position SF2 at time t4 when transfer torque (F) of the assist clutch increases enough, and the gear is disengaged. When shift position (G) becomes near of neutral position SF2 (time t5), it is judged the disengagement control completion in step 403 of FIG. 4, and a synchronous control phase is begun(step 410 of FIG. 4).

In the synchronous control phase, transfer torque (F) of the assist clutch is controlled by thrust load (B) of the assist clutch actuator, and input rotating speed (A) is synchronized from rotating speed Ni_1 corresponding to the first gear to rotating speed Ni_2 corresponding to the second gear. It is judged the synchronous control completion in step 404 of FIG. 4 when the rotating speed is synchronized (time t6), and an engagement control phase is begun (step 411 of FIG. 4).

In the engagement control phase, shift position (G) moves from neutral position SF2 to engagement position SF3 on the second gear side. When shift position (G) moves to engagement position SF3 on the second gear side (time t6), It is judged the engagement control completion in step 405 of FIG. 4, and an end control phase is begun (step 412 of FIG. 4).

In the end control phase, transfer torque (F) of the assist clutch is gradually adjusted to 0(zero). When assist clutch torque (D) is 0(zero) (time t8), it is judged the end control completion in step 406 of FIG. 4. As a result, the shift control is ended, a normal control phase is begun (step 407 of FIG. 4).

In the normal control phase, target thrust load TFa of assist clutch actuator 114 is kept to a fixed value according to function f1 in step 605 of FIG. 6 only for enough time to move assist clutch position (E) to disengagement position PA1. Assist clutch position (E) is moved from torque transmission position PA2 to disengagement position PA1, and all operations are ended.

Thus, thrust load (B) of the assist clutch actuator increases up to the thrust load provided based on function f2 set in step 606 of FIG. 6 at the first stage from time t1 to time t2. At the second stage from time t2 to time t3 when movement time required TMMV1 set in step 503 of FIG. 5 passes, thrust load (B) of the assist clutch actuator is kept constant. At the third stage from time t3 to time t4, thrust load (B) of the assist clutch actuator is increased again. As a result, the occurrence of the collision shock between driven plate 9a and drive plate 9b of assist clutch 9 occurred by rapid action of assist clutch actuator 114 can be evaded, and the decrease in the drive performance (shift quality) can be evaded.

Figure 8:
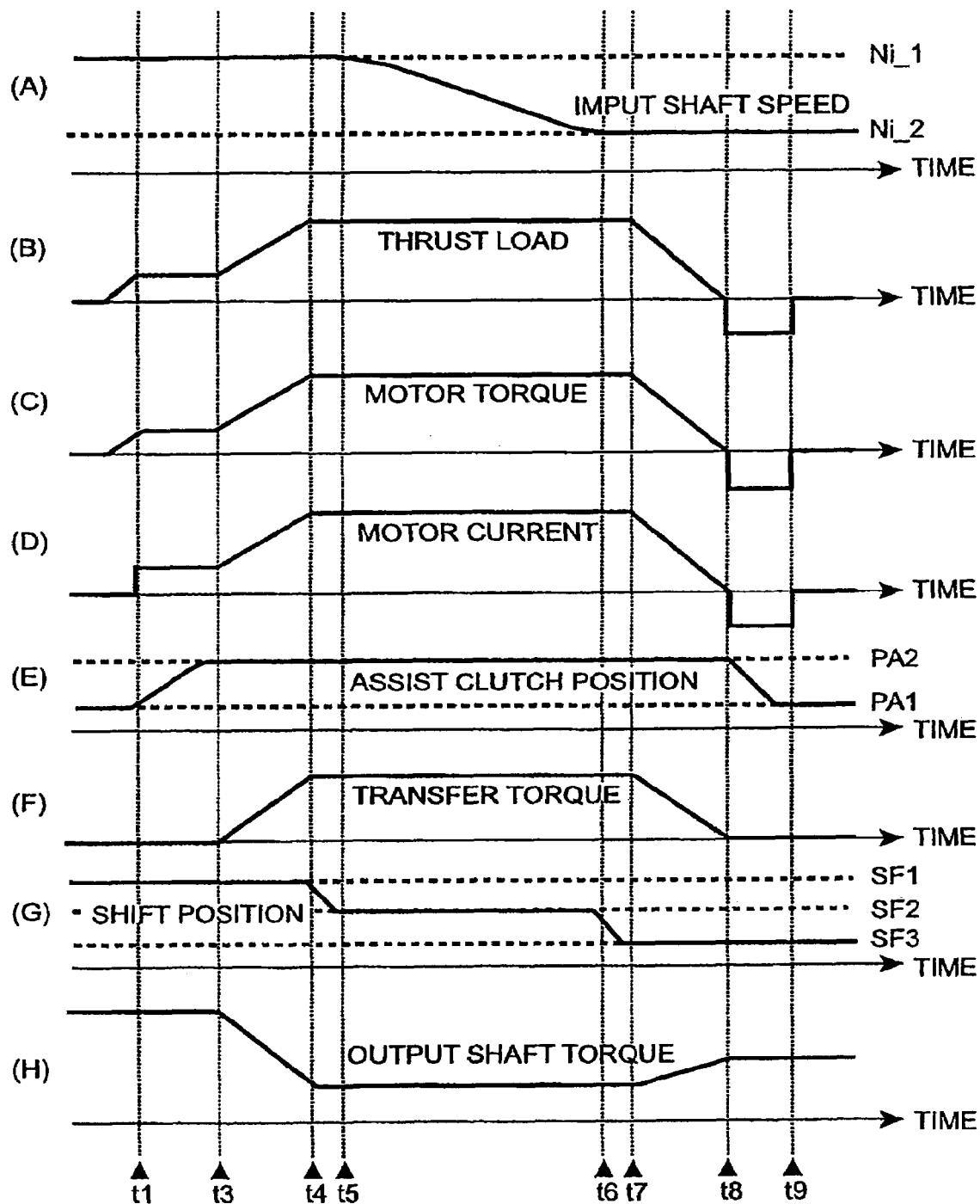
FIG. 8 is a timing chart of the example of a second shift control in the control apparatus of FIG. 1.

Next, an example of the second shift control configured as shown from FIG. 4 to FIG. 6 is explained by using FIG. 8.

The example of this second shift control illustrates the content of the control at upshift from the first gear to the second gear.

FIG. 8 is a timing chart showing a first example of the shift control of the automatic transmission having the electric actuator according to one embodiment of the present invention.

In FIG. 8, the period from time t1 to time t3 is a movement control phase (step 408 of FIG. 4), the period from time t3 to time t5 is a disengagement control phase (step 409 of FIG. 4), the period from time t5 to time t6 is a synchronous control phase (step 410 of FIG. 4), the period from time t6 to time t7 is an engagement control (step 411 of FIG. 4), the period from time t7 to time t8 is an end control phase (step 412 of FIG. 4), and the period since time t8 is a normal control phase (step 407 of FIG. 4).

Further, FIG. 8(A)-FIG. 8(H) are similar to FIG. 7(A)-FIG. 7(H).

In FIG. 8, function f1 in step 605 of FIG. 6 is set so that target thrust load TFa of the assist clutch may be constant until normal control phase timer TmrPH0 reaches a fixed value as well as FIG. 7. Function f1 is set so that target thrust load TFa of the assist clutch may be 0 (zero) when normal control phase timer TmrPH0 is more than a fixed value. Moreover, function f2 in step 606 of FIG. 6 is set so that target thrust load TFa of the assist clutch is 0(zero) when movement control phase timer TmrPH1 is 0(zero). Moreover, function f2 is set so that target thrust load TFa of the assist clutch may become constant, except when movement control phase timer TmrPH1 is 0(zero).

Shifting begins when judged the shifting start by the judgment processing in step 401 of FIG. 4. Here, the shifting is begun at time t1. When shifting begins at time t1, the assist clutch is moved to the torque transmission position in the movement control phase (step 408 of FIG. 4).

Target thrust load TFa of assist clutch actuator 114 is increased to a fixed value according to function f2 set in step 606 of FIG. 6 at time t1 because it is judged the movement control phase in step 603 of FIG. 6. Target torque TMast of the assist clutch motor is calculated in step 608 based on this target thrust load TFa. Further, target electric current IMast of the assist clutch motor is calculated in step 609. The applied voltage to assist motor 114a is adjusted by motor control unit 104 to achieve target electric current IMast of assist motor 114a, and the electric current of assist motor 114a is controlled. As a result, assist motor electric current (D) is increased rapidly, and assist motor torque (C) is increased rapidly along with it. Thrust load (B) of the assist clutch actuator is increased rapidly along with it.

Target thrust load TFa of assist clutch actuator 114 is set to a constant value from time t1 to time t3 according to function f2 set in step 606 of FIG. 6. Accordingly, assist motor electric current (D), assist motor torque (C), and thrust load (B) of the assist clutch actuator are kept constant values. As a result, assist clutch position (E) moves from disengagement position PA1 to torque transmission position PA2 at the speed where the collision shock of driven plate 9a and drive plate 9b of assist clutch 9 is not occurred. At this time, anti-power to thrust load (B) of assist clutch actuator 114 increases because return spring 9d is compressed along with the movement of assist clutch position (E). As a result, assist clutch position (E) moves to torque transmission position PA2 as with assist clutch position (E) being gradually decreased the moving speed.

Movement control phase timer TmrPH1 is counted up in step 502. At time t3 judged that movement control phase timer TmrPH1 becomes more than the movement time required TMMV1 which is the time enough for assist clutch position (E) to move from disengagement position PA1 to torque transmission position PA2 in step 503, movement completion judgment flag fPH1FN=1 (movement completion) is set in step 504. It is judged the movement control completion in step 402 of FIG. 4, and a disengagement control phase is begun (Step 409 of FIG. 4).

A disengagement control phase, a synchronous control phase, an engagement control phase, an end control phase, and a normal control phase since time t3 are similar to ones in FIG. 7.

Thus, thrust load (B) of the assist clutch actuator increases up to the thrust load provided based on function f2 set in step 606 of FIG. 6 at the first stage in time t1. At the second stage from time t1 to time t3 when movement time required TMMV1 set in step 503 of FIG. 5 passes, thrust load (B) of the assist clutch actuator is kept constant. At the third stage from time t3 to time t4, thrust load (B) of the assist clutch actuator is increased again. As a result, the occurrence of the collision shock between driven plate 9a and drive plate 9b of assist clutch 9 occurred by rapid action of assist clutch actuator 114 can be evaded, and the decrease in the drive performance (shift quality) can be evaded.

When movement control phase timer TmrPH1 is 0(zero), target thrust load TFa of the assist clutch is set to 0(zero) in FIG. 8. Function f2 in step 606 of FIG. 6 is set so that target thrust load TFa of the assist clutch may become constant rapidly, except when movement control phase timer TmrPH1 is 0(zero). Therefore, movement time required TMMV1 set in step 503 of FIG. 5 can be set short compared with the case of FIG. 7. That is, the time from time t1 to time t3 can be shortened. It is preferable that function f2 of step 606 of FIG. 6 is set so as to shorten time t1 and time t2 of FIG. 7.

Next, another embodiment of the shift control by the control apparatus of the automatic transmission having an electric actuator of the present invention is explained by using FIG. 9-FIG. 14.

Figure 9:
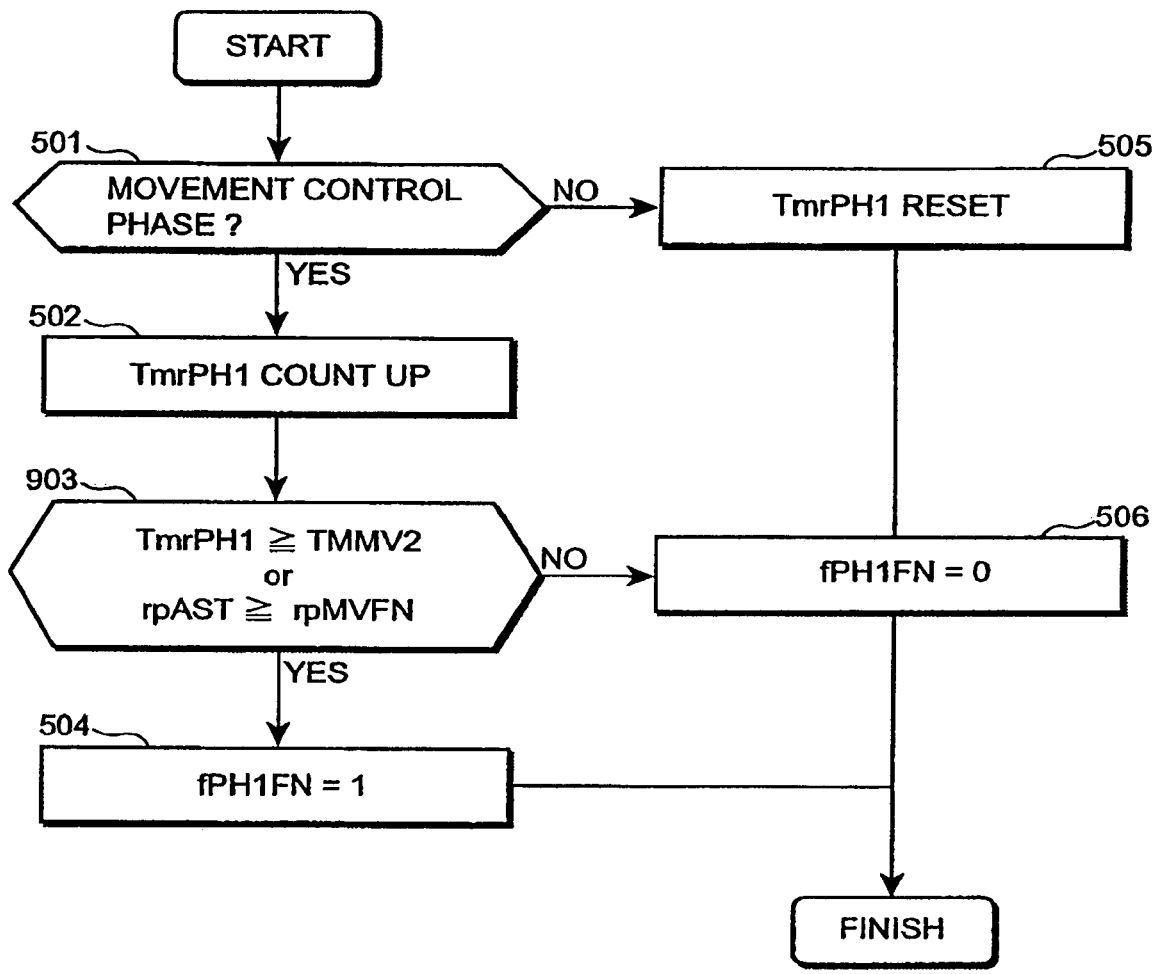
FIG. 9 shows the example of a modification of FIG. 5.

A point different from the embodiment shown from FIG. 4 to FIG. 8 is to be replaced the content of the processing of movement completion judgment flag fPH1FN used to judge the movement completion in step 402 (movement control completion judgment) of FIG. 4 shown in FIG. 5 with that of FIG. 9. In addition, the content of the calculation processing of the assist clutch motor target electric current executed in step 407, 408, 409, 410, 411 and 412 of FIG. 4 shown in FIG. 6 is replaced with that of FIG. 10.

Firstly, the content of the processing of movement completion judgment flag fPH1FN used to judge the movement completion in step 402 (movement control completion judgment) of FIG. 4 is explained by using FIG. 9. The same numeral as FIG. 5 designates same part. The point where FIG. 5 and FIG. 9 are different is to be replaced step 503 of FIG. 5 with step 903.

In step 903, it is judged whether movement control phase timer TmrPH1 is movement time required TMMV2 or more, or assist clutch position rpAST is movement completion judgment position rpMVF N or more. The processing advances to step 504 if movement control phase timer TmrPH1 is movement time required TMMV2 or more or assist clutch position rpAST is movement completion judgment position rpMVFN or more. Movement completion judgment flag fPH1FN=1 (movement completion) is set in step 504, and the processing is ended. The processing advances to step 506 if the timer is less than movement time required TMMV1. Movement completion judgment flag fPH1FN=0(zero) (movement non-completion) is set in step 506, and the processing is ended.

Here, it is preferable to measure in advance the time required until return spring 9d of FIG. 2 is compressed by fixed assist clutch motor target electric current IMast, and thrust force is generated between drive plate 9b and driven plate 9a several times, and to use a value of the largest (longest) measured time required as movement time required TMMV2 of step 903.

Moreover, it is preferable to set the movement completion judgment position rpMVFN in step 903 including the play etc. of the machine uniting element from assist clutch actuator 114 to assist clutch 9 and the stroke of assist clutch 9.

Moreover, the movement completion can be judged by detecting the rotation of assist motor 114a instead of assist clutch position signal rpAST indicating the position of the assist clutch, and checking whether the rotation of the assist motor (that is, the position of the assist clutch) is more than the movement completion judgment rotation.

Figure 10:
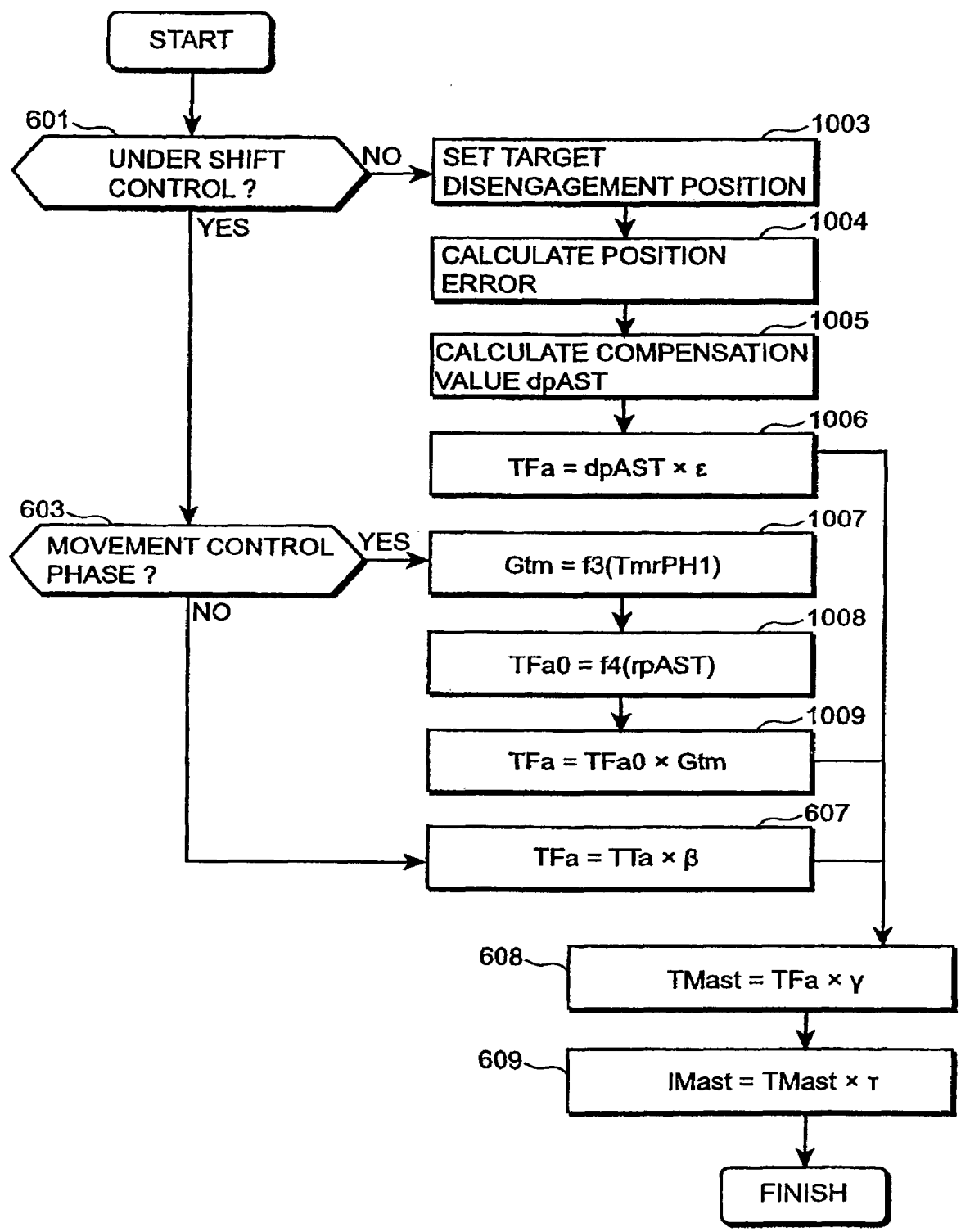
FIG. 10 is a flow chart of the example of a modification of the assist motor torque operation processing in FIG. 9.

Next, the content of the calculation processing of the assist clutch motor target electric current executed in step 407, 408, 409, 410, 411 and 412 of FIG. 4 is explained by using FIG. 10. The same numeral as FIG. 6 designates same part. Different points between FIG. 6 and FIG. 10 are that steps 604 and 605 of FIG. 6 are replaced with steps 1003, 1004, 1005 and 1006, and step 606 of FIG. 6 is replaced with steps 1007, 1008 and 1009.

In steps 1003, 1004, 1005 and 1006, target thrust load TFa of assist clutch actuator 114 is set so that the assist clutch may arrive at a disengagement position.

The processing advances to step 603 if judged that it is under the shift control in step 601. The processing advances to step 1003 if judged that it is not under the shift control. In step 1003, the target disengagement position of the assist clutch in the normal control phase is set. In step 100, the deviation between the target disengagement position of the assist clutch and assist clutch position r pAST is calculated. In step 1005, position feedback correction value dpAST by the proportion correction, the integration correction, and the differentiation correction, etc. is calculated. The conversion coefficient ε is multiplied to position feedback correction value dpAST in step 1006, and target thrust load TFa of assist clutch actuator 114 is set. The conversion coefficient ε is set from the lead of the ball screw of FIG. 2, the inertias such as the motor, gears, arms, the reduction gear ratio, the efficiency of the gear.

In steps 1007, 1008 and 1009, target thrust load TFa of assist clutch actuator 114 is set so that the state just before the thrust force is generated between drive plate 9b and driven plate 9a may be obtained by stroking rod 114f in FIG. 2 and compressing return spring 9d.

The processing advances to step 1007 if judged that it is a movement control phase in step 603. In step 1007, target thrust load gain Gtm is set based on function f3 which input movement control phase timer TmrPH1. Here, target thrust load gain Gtm takes the value from 0 to 1. Function f3 is set so that target thrust load gain Gtm may become 1 when the value of movement control phase timer TmrPH1 increases. Next, basic value TFa0 of the target thrust load of assist clutch actuator 114 is set in step 1008 based on function f4 which inputs assist clutch position rpAST Next, target thrust load gain Gtm is multiplied to basic value TFa0 of the target thrust load of assist clutch actuator 114 in step 1009, and target thrust load TFa of assist clutch actuator 114 is calculated.

Figure 11:
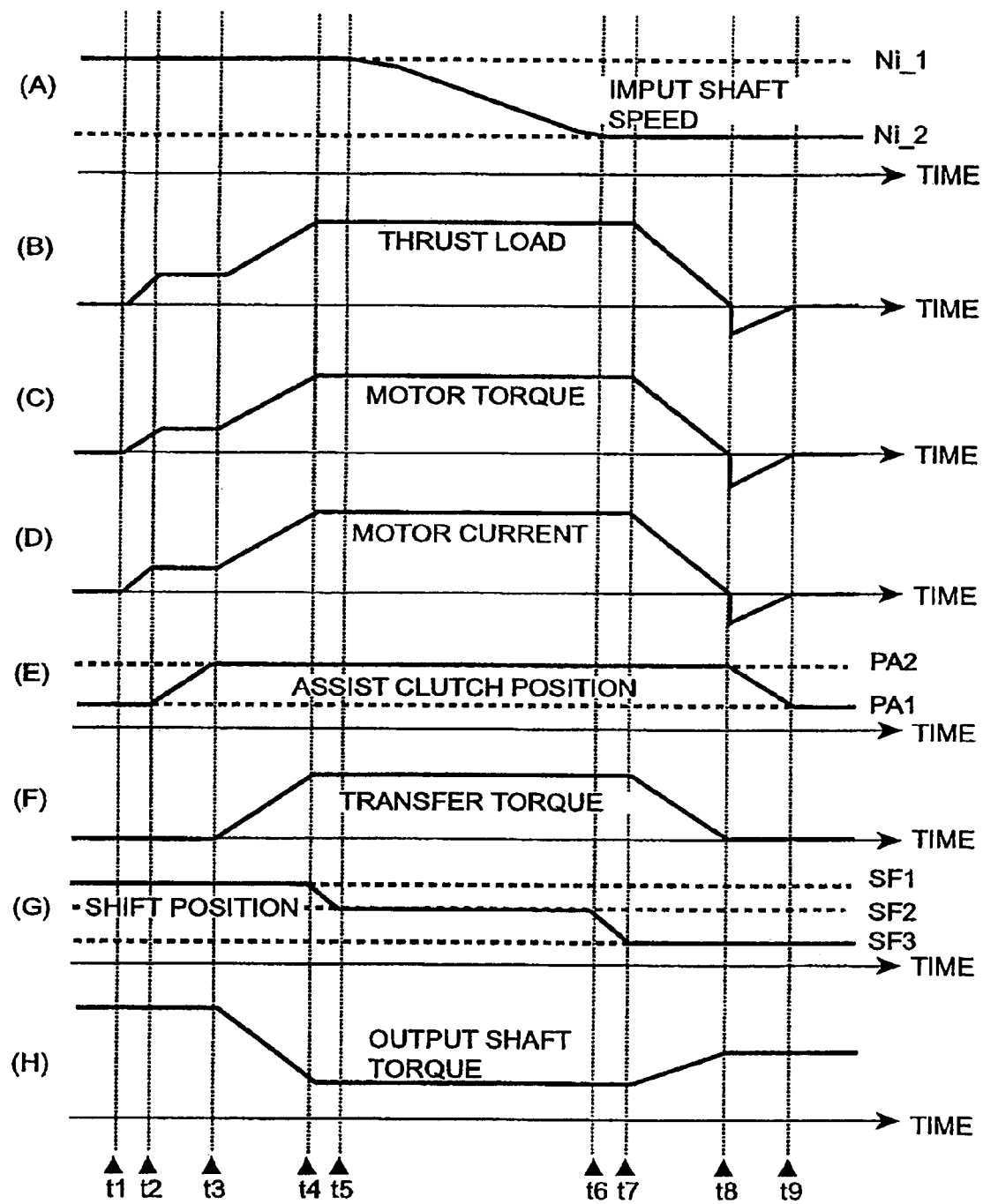
FIG. 11 is a timing chart of the example of the first shift control in the example of a modification of the control apparatus of FIG. 1.

Next, an example of the first shift control configured as shown from FIG. 4, FIG. 9 and FIG. 10 is explained by using FIG. 11. FIG. 11 shows a timing chart of a modification example of the shift control at upshift from the first gear to the second gear the example of a modification the shift control when the improvement from the first gear to the second gear shifts. In FIG. 11, the time of the abscissa is similar to one in FIG. 7. Moreover, FIG. 11(A)-FIG. 11(H) is similar to FIG. 7(A)-FIG. 7(H).

In FIG. 11, function f3 in step 1007 of FIG. 10 is set so that target thrust load gain Gtm may increase constantly from 0(zero) to 1 until movement control phase timer TmrPH1 reaches a fixed value. Target thrust load gain Gtm is set to 1 when movement control phase timer TmrPH1 is more than a fixed value. Moreover, function f4 in step 1008 of FIG. 10 is set so that basic value TFa0 of the target thrust load of assist clutch actuator 114 may become constant regardless of assist clutch position rpAST.

Shift position rpSFT is SF1 on "first gear side" as shown in FIG. 11 (G), and the first gear position has been kept before time t1. At this time, input shaft speed Ni is rotating speed Ni_1 corresponding to the first gear position as shown in FIG. 11(A).

The shifting is begun if judged the shifting start by the judgment processing in step 401 of FIG. 4. The shifting is begun here at time t1. When shifting begins at time t1, the assist clutch is moved to the torque transmission position in the movement control phase (step 408 of FIG. 4).

Target thrust load gain Gtm constantly increases from 0(zero) to 1 between time t1 and time t2 based on function f3 in step 1007 of FIG. 10 because it is judged the movement control phase in step 603 of FIG. 10. Therefore, thrust load TFa of the assist clutch actuator increases to basic value TFa0 of the assist clutch thrust load set based on function f4 in step 1008 of FIG. 10 according to the processing TFa=TFa0×Gtm in step 1009 of FIG. 10. Target torque TMast of the assist clutch motor is calculated based on this target thrust load TFa in step 608 of FIG. 10. Further, target electric current IMast of the assist clutch motor is calculated in step 609 of FIG. 10. The applied voltage to assist motor 114a is adjusted by motor control unit 104 to achieve target electric current IMast of assist motor 114a, and thereby the electric current of assist motor 114a is controlled. As a result, the assist motor electric current of FIG. 11(D) increases. The assist motor torque of FIG. 11(C) increases along with it. Thrust load of the assist clutch actuator of FIG. 11(B) increases.

Target thrust load gain Gtm of function f3 in step 1007 of FIG. 10 becomes 1 between time t2 and time t3. As a result, target thrust load TFa of assist clutch actuator 114 becomes basic value TFa0 (constant value) of the assist clutch thrust load set based on function f4 in step 1008 of FIG. 10. Accordingly, assist motor electric current (D), assist motor torque (C), and thrust load (B) of the assist clutch actuator are kept constant values. As a result, assist clutch position (E) moves from disengagement position PA1 to torque transmission position PA2 at the speed where the collision shock of driven plate 9a and drive plate 9b of assist clutch 9 is not occurred. At this time, anti-power to thrust load (B) of assist clutch actuator 114 increases because return spring 9d is compressed along with the movement of assist clutch position (E). As a result, assist clutch position (E) moves to torque transmission position PA2 as with assist clutch position (E) being gradually decreased the moving speed.

It is judged that rpAST≧rpMVFN is satisfied in step 903 of FIG. 9 at time t3 where assist clutch position (E) moves to the vicinity of torque transmission position PA2. Movement completion judgment flag fPH1FN=1 (movement completion) is set by processing in step 504 of FIG. 9. Moreover, it is judged the movement control completion in step 402 of FIG. 4, and a disengagement control phase is begun (step 409 of FIG. 4).

A disengagement control phase, a synchronous control phase, an engagement control phase, an end control phase, and a normal control phase since time t3 are similar to ones in FIG. 7.

Thus, thrust load (B) of the assist clutch actuator increases with the inclination provided by the gain setting about function f3 of step 1007 of FIG. 10 up to the thrust load provided based on function f4 set in step 1008 of FIG. 10 at the first stage from time t1 to time t2. At the second stage where the assist clutch position (E) moves to movement completion judgment position rpMVFN set in step 903 of FIG. 9, thrust load (B) of the assist clutch actuator is kept constant. At the third stage from time t3 to time t4, thrust load (B) of the assist clutch actuator is increased again. As a result, the occurrence of the collision shock between driven plate 9a and drive plate 9b of assist clutch 9 occurred by rapid action of assist clutch actuator 114 can be evaded, and the decrease in the drive performance (shift quality) can be evaded.

Figure 12:
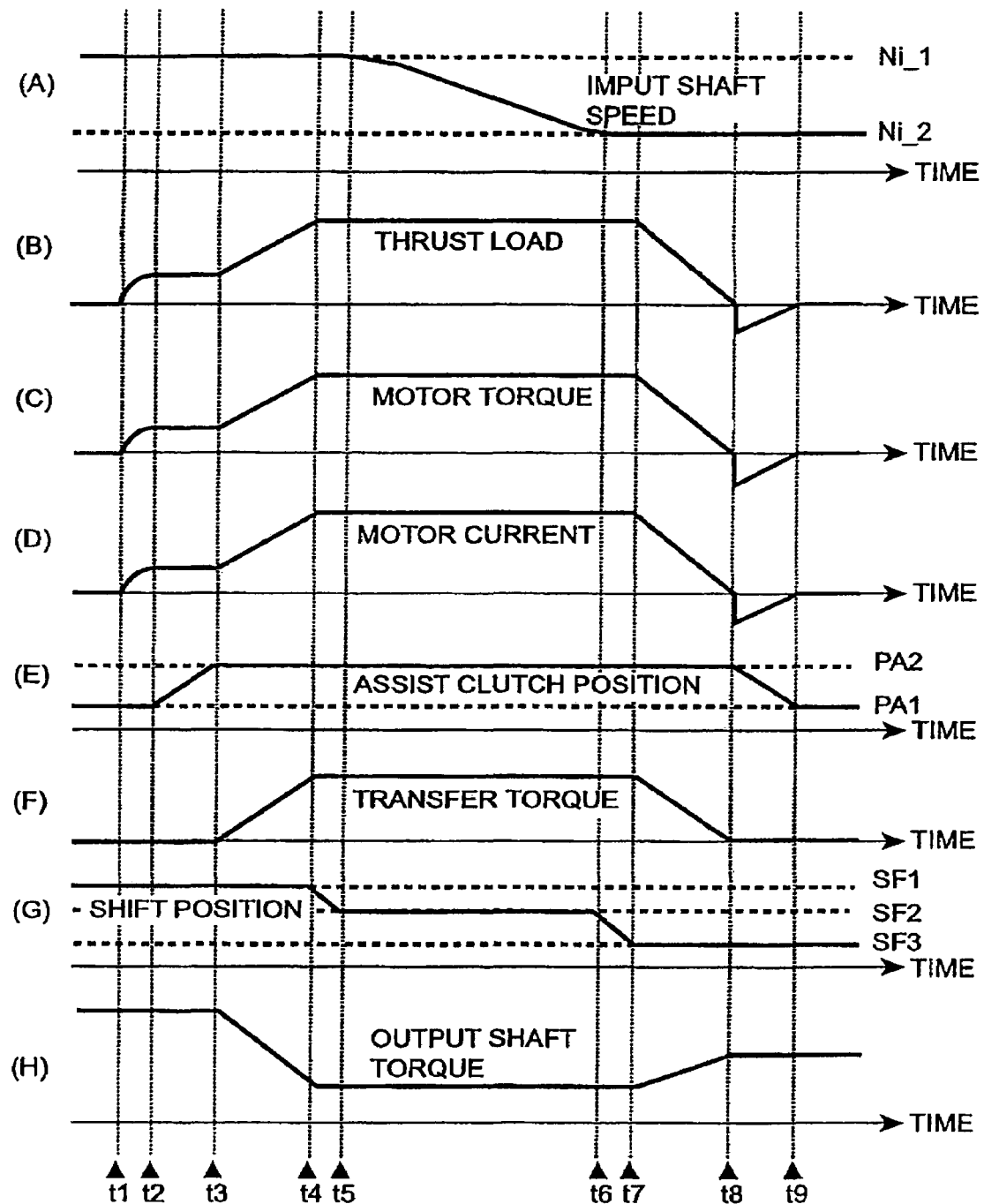
FIG. 12 is a timing chart of the example of the second shift control in the example of a modification of the control apparatus of FIG. 1.

Next, an example of the second shift control configured as shown from FIG. 4, FIG. 9 and FIG. 10 is explained by using FIG. 12. FIG. 12 shows a timing chart of a modification example of the shift control at upshift from the first gear to the second gear. In FIG. 12, the time of the abscissa is similar to one in FIG. 7. Moreover, FIG. 12(A)-FIG. 12(H) is similar to FIG. 7(A)-FIG. 7(H).

Function f3 in step 1007 of FIG. 10 is set so that target thrust load gain Gtm may increase gradually from 0(zero) to 1, having a lot of inflection points, until movement control phase timer TmrPH1 reaches a fixed value in FIG. 12. When movement control phase timer TmrPH1 is more than a fixed value, function f3 is set so that target thrust load gain Gtm may become 1. Moreover, Function f4 in step 1008 of FIG. 10 is set so that basic value TFa0 of the target thrust load of assist clutch actuator 114 may become constant regardless of assist clutch position rpAST.

The shifting is begun if judged that the shifting start by the judgment processing in step 401 of FIG. 4. Here, the shifting is begun at time t1. When the shifting is begun at time t1, the assist clutch is moved to the torque transmission position in the movement control phase (step 408 of FIG. 4).

Target thrust load gain Gtm gradually increases from 0(zero) to 1, having a lot of inflection points, between time t1 and time t2 based on function f3 set in step 1007 of FIG. 10 because it is judged the movement control phase in step 603 of FIG. 10. Thrust load TFa of the assist clutch actuator gradually increases to basic value TFa0 of the assist clutch thrust load set based on function f4 in step 1008 of FIG. 10, having a lot of inflection points, according to the processing TFa=TFa0×Gtm in step 1009 of FIG. 10. Target torque TMast of the assist clutch motor is calculated based on this target thrust load Tfa in step 608 of FIG. 10. Further, target electric current IMast of the assist clutch motor is calculated in step 609 of FIG. 10. The applied voltage to assist motor 114a is adjusted by motor control unit 104 to achieve target electric current IMast of assist motor 114a, and the electric current of assist motor 114a is controlled. As a result, the thrust load of the assist clutch actuator of FIG. 11(B) increases.

Target thrust load gain Gtm of function f3 in step 1007 of FIG. 10 becomes 1 between time t2 and time t3. As a result, target thrust load TFa of assist clutch actuator 114 becomes basic value TFa0 (constant value) of the assist clutch thrust load set based on function f4 in step 1008 of FIG. 10. As a result, thrust load (B) of the assist clutch actuator is kept to a constant value. As a result, assist clutch position (E) moves from disengagement position PA1 to torque transmission position PA2 at the speed where the collision shock of driven plate 9*a* and drive plate 9*b* of assist clutch 9 is not occurred. At this time, anti-power to thrust load (B) of assist clutch actuator 114 increases because return spring 9*d* is compressed along with the movement of assist clutch position (E). As a result, assist clutch position (E) moves to torque transmission position PA2 as with assist clutch position (E) being gradually decreased the moving speed.

It is judged that rpAST≧rpMVFN is satisfied in step 903 of FIG. 9 at time t3 where assist clutch position (E) moves to the vicinity of torque transmission position PA2. Movement completion judgment flag fPH1FN=1 (movement completion) is set by processing in step 504 of FIG. 9. Moreover, it is judged the movement control completion in step 402 of FIG. 4, and a disengagement control phase is begun (step 409 of FIG. 4).

A disengagement control phase, a synchronous control phase, an engagement control phase, an end control phase, and a normal control phase since time t3 are similar to ones in FIG. 7.

Thus, thrust load (B) of the assist clutch actuator increases with the inclination provided by the gain setting about function f3 of step 1007 of FIG. 10 up to the thrust load provided based on function f4 set in step 1008 of FIG. 10 at the first stage from time t1 to time t2. At the second stage where the assist clutch position (E) moves to movement completion judgment position rpMVFN set in step 903 of FIG. 9, thrust load (B) of the assist clutch actuator is kept constant. At the third stage from time t3 to time t4, thrust load (B) of the assist clutch actuator is increased again. As a result, the occurrence of the collision shock between driven plate 9*a* and drive plate 9*b* of assist clutch 9 occurred by rapid action of assist clutch actuator 114 can be evaded, and the decrease in the drive performance (shift quality) can be evaded.

Figure 13:
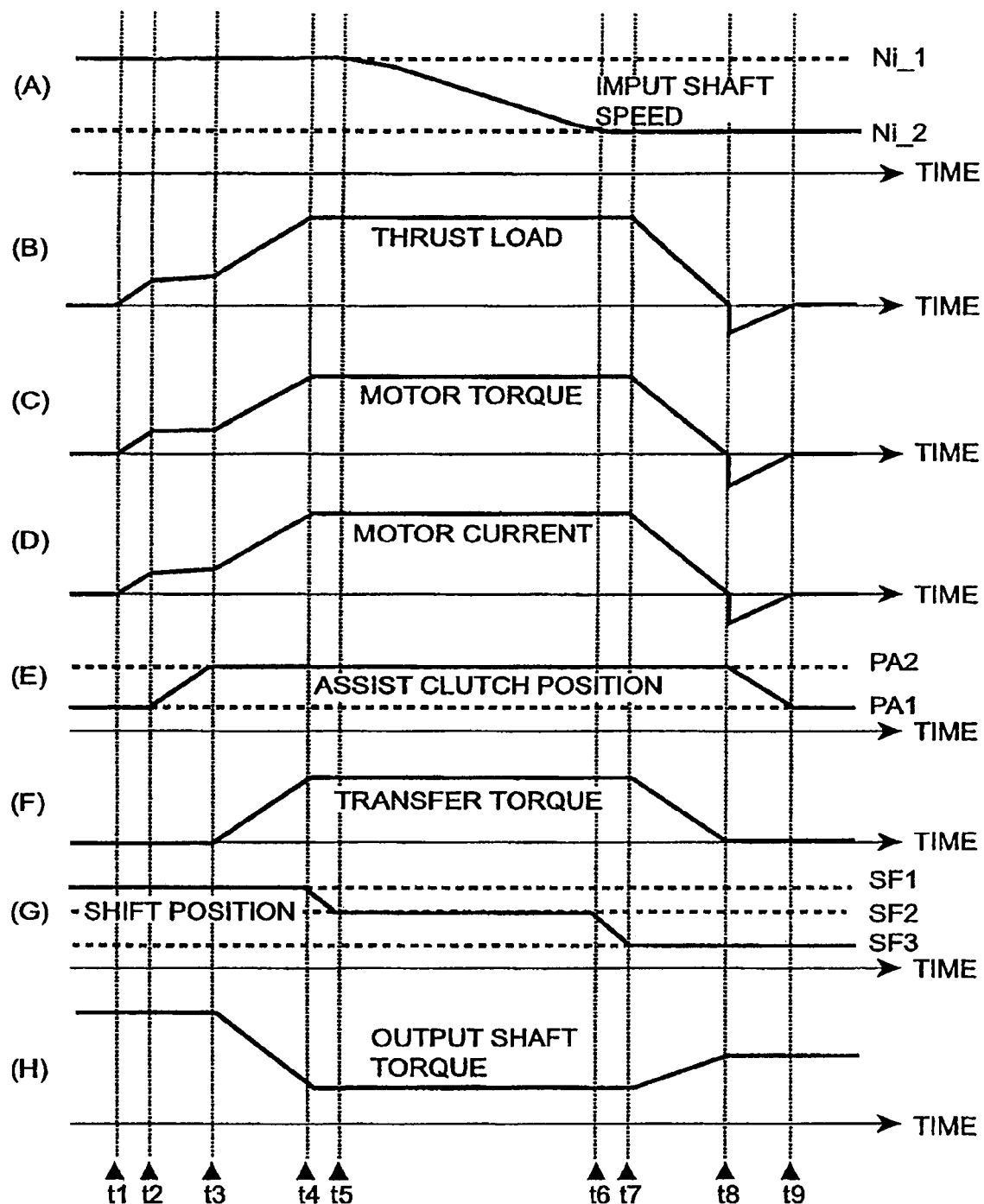
FIG. 13 is a timing chart of the example of the third shift control in the example of a modification of the control apparatus of FIG. 1.

Next, an example of the second shift control configured as shown from FIG. 4, FIG. 9 and FIG. 10 is explained by using FIG. 13. FIG. 13 shows a timing chart of a modification example of the shift control at upshift from the first gear to the second gear.

In FIG. 13, the time of the abscissa is similar to one in FIG. 7.

Moreover, FIG. 13(A)-FIG. 13(H) are similar to FIG. 7(A)-FIG. 7(H).

In FIG. 13, Function f3 in step 1007 of FIG. 10 is set so that target thrust load gain Gtm may increase constantly from 0(zero) to 1 until movement control phase timer TmrPH1 reaches a fixed value. Moreover, when movement control phase timer TmrPH1 is more than a fixed value, function f3 is set so that target thrust load gain Gtm may become 1. Moreover, function f4 in step 1008 of FIG. 10 is set so that basic value TFa0 of the target thrust load of assist clutch actuator 114 may increase gradually as assist clutch position rpAST strokes from the disengagement position to the torque transmission position.

In the movement control phase (step 408 of FIG. 4) from time t1 to time t3. Target thrust load gain Gtm is constantly increased from 0(zero) to 1 between time t1 and time t2 based on function f3 set in step 1007 of FIG. 10. As a result, thrust load TFa of the assist clutch actuator is constantly increased to basic value TFa0 of the assist clutch thrust load set based on function f4 of step 1008 of FIG. 10 by the processing TFa=TFa0×Gtm in step 1009 of FIG. 10. Target torque TMast of the assist clutch motor is calculated based on this target thrust load TFa in step 608 of FIG. 10. Further, target electric current IMast of the assist clutch motor is calculated in step 609 of FIG. 10. The applied voltage to assist motor 114*a* is adjusted by motor control unit 104 to achieve target electric current IMast of assist motor 114*a*, and thereby, the electric current of assist motor 114*a* is controlled. As a result, the thrust load of the assist clutch actuator of FIG. 11(B) is increased.

Basic value TFa0 of the assist clutch thrust load set based on function f4 of step 1008 of FIG. 10 increases gradually according to assist clutch position (E) because target thrust load gain Gtm of function f3 in step 1007 of FIG. 10 is 1 from time t2 to time t3. Therefore, target thrust load TFa of assist clutch actuator 114 increases gradually, too. As a result, assist motor electric current (D), assist motor torque (C), and thrust load (B) of the assist clutch actuator increase gradually. Thereby, assist clutch position (E) moves from disengagement position PA1 to torque transmission position PA2 at the speed where the collision shock of driven plate 9*a* and drive plate 9*b* of assist clutch 9 is not occurred. At this time, antipower to thrust load (B) of assist clutch actuator 114 increases because return spring 9*d* is compressed along with the movement of assist clutch position (E). As a result, assist clutch position (E) moves to torque transmission position PA2 as with assist clutch position (E) being gradually decreased the moving speed.

It is judged that rpAST≧rpMVFN is satisfied in step 903 of FIG. 9 at time t3 where assist clutch position (E) moves to the vicinity of torque transmission position PA2. Movement completion judgment flag fPH1FN=1 (movement completion) is set by processing in step 504 of FIG. 9. Moreover, it is judged the movement control completion in step 402 of FIG. 4, and a disengagement control phase is begun (step 409 of FIG. 4).

A disengagement control phase, a synchronous control phase, an engagement control phase, an end control phase, and a normal control phase since time t3 are similar to ones in FIG. 7.

Thus, thrust load (B) of the assist clutch actuator increases with the inclination provided by the gain setting about function f3 of step 1007 of FIG. 10 up to the thrust load provided based on function f4 set in step 1008 of FIG. 10 at the first stage from time t1 to time t2. At the second stage where the assist clutch position (E) moves to movement completion judgment position rpMVFN set in step 903 of FIG. 9, thrust load (B) of the assist clutch actuator is increased gradually based on function f4 set in step 1008 of FIG. 10. At the third stage from time t3 to time t4, thrust load (B) of the assist clutch actuator is increased again. As a result, the occurrence of the collision shock between driven plate 9*a* and drive plate 9*b* of assist clutch 9 occurred by rapid action of assist clutch actuator 114 can be evaded, and the decrease in the drive performance (shift quality) can be evaded.

Figure 14:
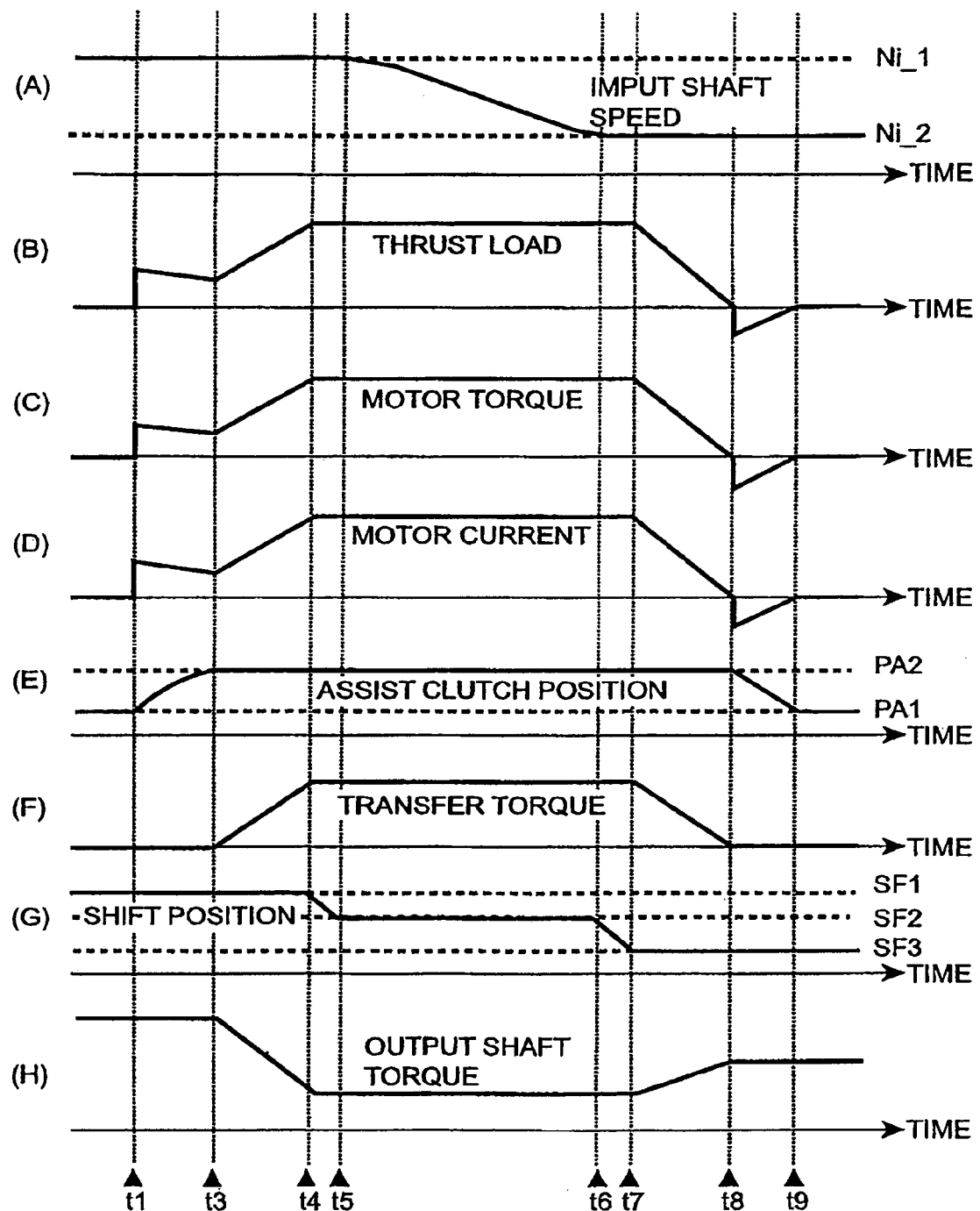
FIG. 14 is a timing chart of the example of a fourth shift control in the example of a modification the control apparatus of FIG. 1.

Next, an example of the second shift control configured as shown from FIG. 4, FIG. 9 and FIG. 10 is explained by using FIG. 14. FIG. 14 shows a timing chart of a modification example of the shift control at upshift from the first gear to the second gear. In FIG. 14, the time of the abscissa is similar to one in FIG. 7. Moreover, FIG. 14(A)-FIG. 14(H) is similar to FIG. 7(A)-FIG. 7(H).

In FIG. 14, function f3 in step 1007 of FIG. 10 is set so that target thrust load gain Gtm may become 1 regardless of the value of movement control phase timer TmrPH1. Moreover, when assist clutch position rpAST is at the disengagement position, function f4 of step 1008 of FIG. 10 is set so that basic value TFa0 of the target thrust load of assist clutch actuator 114 may have a large value. Further, function f4 is set so that basic value TFa0 of the target thrust load of assist clutch actuator 114 may decrease gradually as the assist clutch strokes from the disengagement position to the torque transmission position.

In the movement control phase (step 408 of FIG. 4) from time t1 to time t3, thrust load TFa of the assist clutch actuator is increased rapidly to basic value TFa0 of assist clutch thrust load set based on function f4 of step 1008 of FIG. 10 in one control cycle by the processing TFa=TFa0× Gtm in step 1009 of FIG. 10, because target thrust load gain Gtm is 1 by function f3 set in step 1007 of FIG. 10 at time t1. Target torque TMast of the assist clutch motor is calculated in step 608 of FIG. 10 based on this target thrust load TFa. Further, target electric current IMast of the assist clutch motor is calculated in step 609 of FIG. 10. To achieve target electric current IMast of assist motor 114a, the voltage applied to assist motor 114a is adjusted by motor control unit 104. Thereby, the electric current of assist motor 114a is controlled. As a result, the thrust load of the assist clutch actuator in FIG. 11(B) is increased rapidly.

because target thrust load gain Gtm of function f3 in step 1007 of FIG. 10 is 1 from time t1 to time t3, assist clutch thrust load basic value TFa0 set based on function f4 of step 1008 of FIG. 10 may decrease gradually according to assist clutch position (E) and target thrust load TFa of assist clutch actuator 114 decreases gradually, too. As a result, assist motor electric current (D), assist motor torque (C), and thrust load (B) of the assist clutch actuator decrease gradually. Thereby, assist clutch position (E) moves from disengagement position PA1 to torque transmission position PA2 at the speed where the collision shock of driven plate 9a and drive plate 9b of assist clutch 9 is not occurred. At this time, antipower to thrust load (B) of assist clutch actuator 114 increases because return spring 9d is compressed along with the movement of assist clutch position (E). As a result, assist clutch position (E) moves to torque transmission position PA2 as with assist clutch position (E) being gradually decreased the moving speed.

It is judged that rpAST≧rpMVFN is satisfied in step 903 of FIG. 9 at time t3 where assist clutch position (E) moves to the vicinity of torque transmission position PA2. Movement completion judgment flag fPH1FN=1 (movement completion) is set by processing in step 504 of FIG. 9. Moreover, it is judged the movement control completion in step 402 of FIG. 4, and a disengagement control phase is begun (step 409 of FIG. 4).

A disengagement control phase, a synchronous control phase, an engagement control phase, an end control phase, and a normal control phase since time t3 are similar to ones in FIG. 7.

Thus, thrust load (B) of the assist clutch actuator increases rapidly with the inclination provided by the gain setting about function f3 of step 1007 of FIG. 10 up to the thrust load provided based on function f4 set in step 1008 of FIG. 10 at the first stage of time t1. At the second stage where the assist clutch position (E) moves to movement completion judgment position rpMVFN set in step 903 of FIG. 9, thrust load (B) of the assist clutch actuator is decreased gradually based on function f4 set in step 1008 of FIG. 10. At the third stage from time t3 to time t4, thrust load (B) of the assist clutch actuator is increased again. As a result, the occurrence of the collision shock between driven plate 9a and drive plate 9b of assist clutch 9 occurred by rapid action of assist clutch actuator 114 can be evaded, and the decrease in the drive performance (shift quality) can be evaded.

In FIG. 14, function f3 in step 1007 of FIG.10 is set so that target thrust load gain Gtm may become 1 regardless of the value of movement control phase timer TmrPH1. Moreover, function f4 in step 1008 of FIG. 10 is set so that basic value TFa0 of the target thrust load of assist clutch actuator 114 my have a large value when assist clutch position rpAST is at the disengagement position. Basic value TFa0 of the target thrust load of assist clutch actuator 114 becomes small gradually as the assist clutch strokes from the disengagement position to the torque transmission position. Therefore, the time between to and t3 during which assist clutch position (E) moves from disengagement position PA1 to torque transmission position PA2 can be shortened compared with FIG. 11, FIG. 12, and FIG. 13. It is preferable to shorten time t1 and time t2 of FIG. 11, FIG. 12, and FIG. 13 as for function f3 of step 1007 of FIG. 10 like this. Moreover, it is preferable to set somewhat more greatly function f4 in step 1008 of FIG. 10 while assist clutch position (E) is in the vicinity of disengagement position PA1 than one while assist clutch position (E) is in the vicinity of torque transmission position PA2. Further, it is preferable to set function f4 in step 1008 of FIG. 10 so that the moving speed while the assist clutch position (E) is in the neighborhood of disengagement position PA1 may be set a little bit larger than that while in the neighborhood of torque transfer position PA2, the moving speed may be relatively faster when the assist clutch position (E) begins to move from disengagement position PA1 to torque transfer position PA2, and the moving speed may become slower gradually as the assist clutch position (E) approaches torque transmission position PA2.

Figure 15:
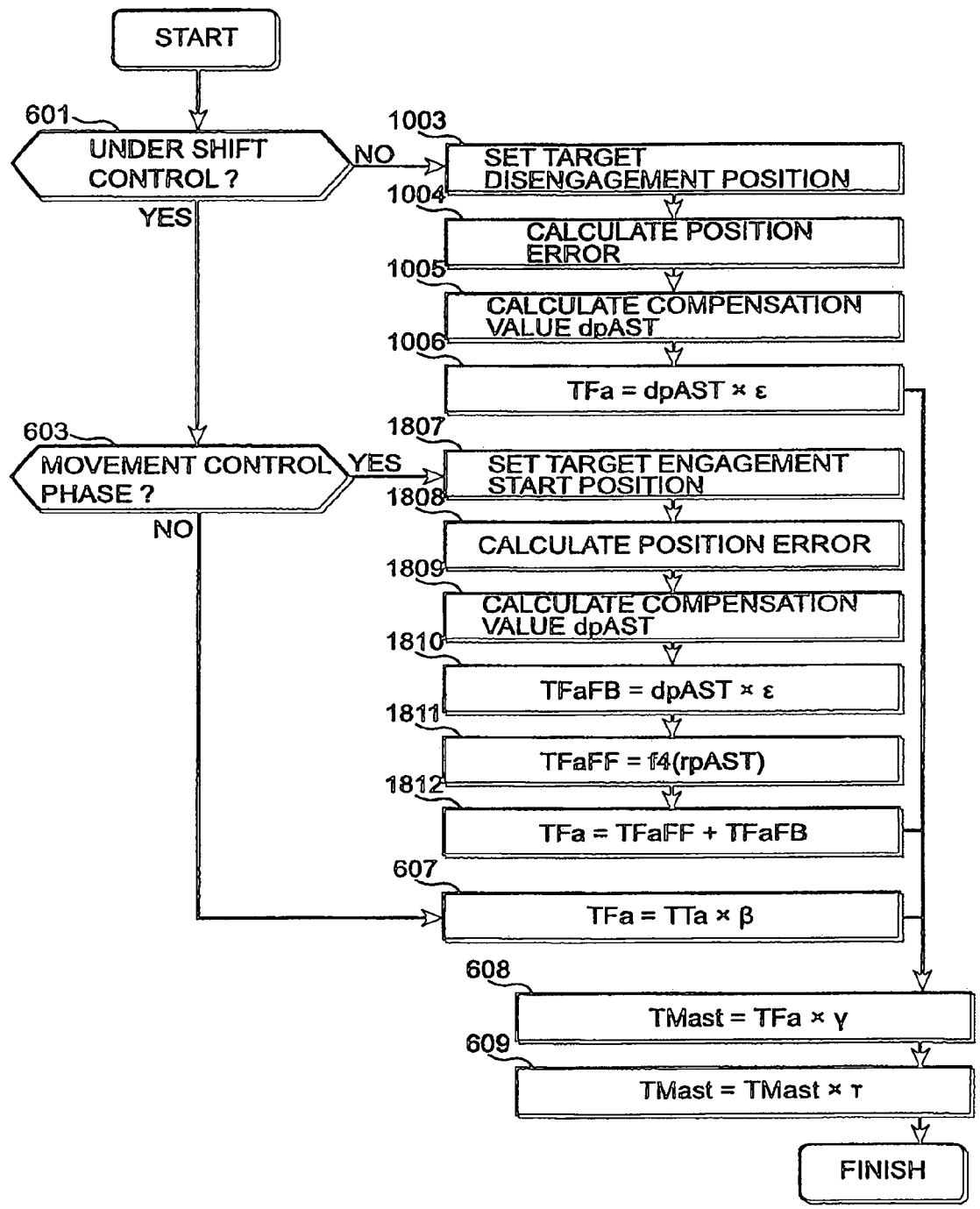
FIG. 15 shows the content of the calculation processing of the assist clutch motor target electric current in FIG. 4.
Figure 18:
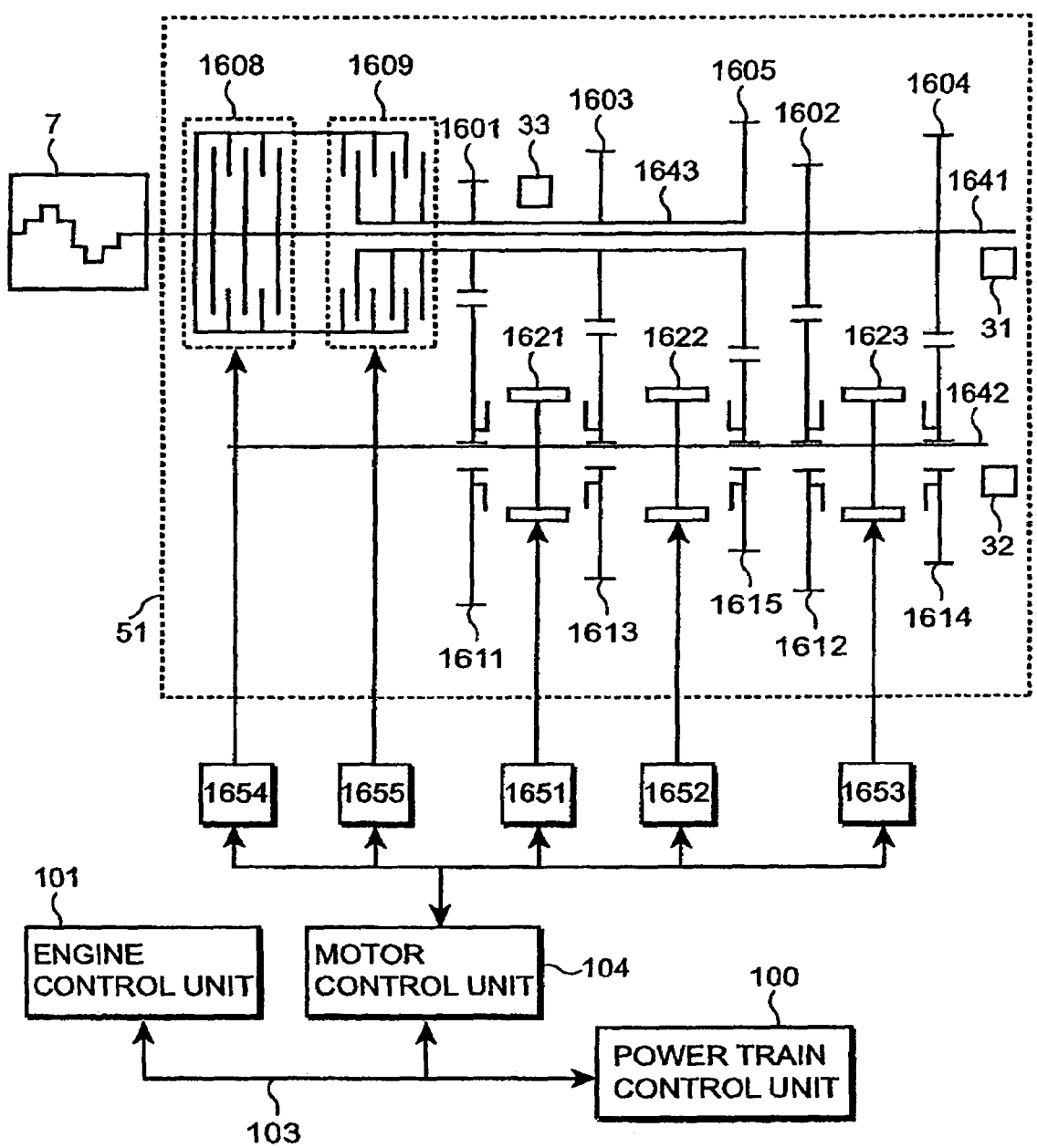
FIG. 18 is a skeleton view showing the configuration of the control apparatus of the automatic transmission according to another embodiment of the present invention.

Next, the content of the calculation processing of the assist clutch motor target electric current executed in steps 407, 408, 409, 410, 411 and 412 of FIG. 4 is explained by using FIG. 15. The same numerals as FIG. 6 and FIG. 10 designate same parts. A different point between FIG. 10 and FIG. 18 is that steps 1007, 1008, and 1009 of FIG. 10 are replaced with steps 1807, 1808, 1809, 1810, 1811, and 1812.

In steps 1807, 1808, 1809, 1810, 1811 and 1812, target thrust load TFa of assist clutch actuator 114 is set so that the assist clutch may arrive the engagement starting position.

In step 601, the processing advances to step 1003 if judged that it is under the shift control, while, the processing advances to step 603 if judged that it is not under the shift control.

In step 1003, the target disengagement position of the assist clutch in the normal control phase is set. In step 1004, the target disengagement position of the assist clutch and deviation at assist clutch position rpAST are calculated. In step 1005, position feedback correction value dpAST by the proportion correction, the integration correction, and the differentiation correction, etc. is calculated. The conversion coefficient ∈ is multiplied to position feedback correction value dpAST in step 1006, and target thrust load TFa of assist clutch actuator 114 is set. The conversion coefficient ∈ is set from the lead of the ball screw of FIG. 2, inertias such as the motor, gears, and arms, reduction gear ratios of the gear, and the efficiency of the gear etc. here.

In steps 1807, 1808, 1809, 1810, 1811 and 1812, target thrust load TFa of assist clutch actuator 114 is set so that the state just before the thrust force is generated between drive plate 9b and driven plate 9a may be obtained by stroking rod 114f in FIG. 2 and compressing return spring 9d.

The processing advances to step 1807 if judged that it is a movement control phase in step 603. In step 1807, the target engagement starting position of the assist clutch in the movement control phase is set. In step 1808, the deviation between the target engagement starting position of the assist clutch and assist clutch position rpAST is calculated. In step 1809, position feedback correction value dpAST by the proportion correction, the integration correction, and the differentiation correction, etc. is calculated. The conversion coefficient e is multiplied to position feedback correction value dpAST in step 1810, and target feedback thrust load TFaFB of assist clutch actuator 114 is set. The conversion coefficient E is the same as the coefficient in step 1006. Next, target feedforward thrust load TFaFF of assist clutch actuator 114 is set by referring function f4 which inputs assist clutch position rpA ST same as step 1008 of FIG. 10 in step 1811. Further, target thrust load TFa of assist clutch actuator 114 by adding target feedback thrust load TFaFB and target feedforward thrust load TFaFF in step 1812.

Figure 16:
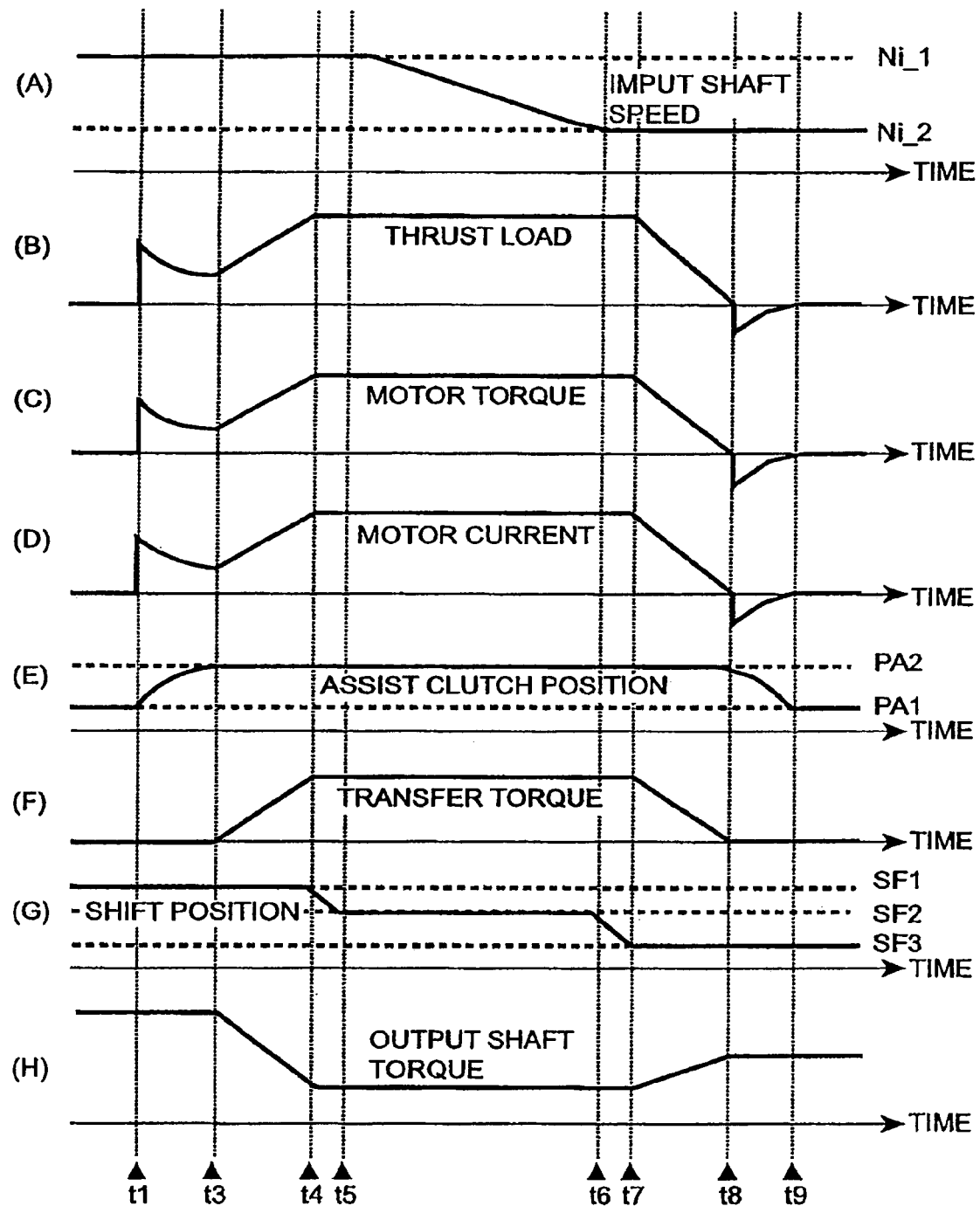
FIG. 16 shows the example of the shift control like FIG. 4, FIG. 9, and FIG. 15.

Next, an example of the second shift control configured as shown from FIG. 4, FIG. 9 and FIG. 15 is explained by using FIG. 16. FIG. 16 shows a timing chart of a modification example of the shift control at upshift from the first gear to the second gear.

In FIG. 16, the time of the abscissa is similar to one in FIG. 7.

Moreover, FIG. 16(A)-FIG. 16(H) are similar to FIG. 11(A)-FIG. 11(H).

Regardless of a In FIG. 16, function f4 in step 1008 of FIG. 15 is set for target feedforward thrust load TFaFF of assist clutch actuator 114 to become constant assist clutch position rpAST. Moreover, target engagement starting position is set to PA2 of FIG. 16(E) in the setting of the target engagement starting position in step 1807 of FIG. 15.

Before time t1, shift position rpSFT is SF1 on "first gear side" as shown in FIG. 16(G), and the first gear position is maintained. At this time, input shaft speed Ni is rotating speed Ni_1 corresponding to the first gear as shown in FIG. 16(A).

The shifting is begun if judged that it is the shifting start by the judgment processing in step 401 of FIG. 4. The shifting is begun at time t1. When the shifting is begun at time t1, the assist clutch is moved to the torque transmission position in the movement control phase (step 408 of FIG. 4).

In the movement control phase (step 408 of FIG. 4) from time t1 to time t3, the thrust load is increased rapidly in one control cycle up to target feedforward thrust load TFaFF set based on function f4 in step 1811 of FIG. 15 at time t1. At time t1, the position deviation calculated in step 1808 of FIG. 15 becomes large, because the difference between the assist clutch position of FIG. 16(E) and target engagement starting position set in step 1807 of FIG. 15, that is, PA2 of FIG. 16(E) is large. Therefore, target feedback thrust load TFaF B set based on step 1810 also increases rapidly. As a result, thrust load TFa of the assist clutch actuator calculated by adding target feedforward thrust load TFaFF and target feedback thrust load TFaFB increases rapidly in one control cycle. Target torque TMast of the assist clutch motor is calculated based on this target thrust load Tfa in step 608 of FIG. 15. Further, target electric current IMast of the assist clutch motor is calculated in step 609 of FIG. 15. The applied voltage to assist motor 114a is adjusted by motor control unit 104 to achieve target electric current IMast of assist motor 114a, and the electric current of assist motor 114a is controlled. As a result, the thrust load of the assist clutch actuator of FIG. 16(B) increases rapidly.

The difference between assist clutch position (E) and target engagement starting position (PA2) decreases gradually from time t1 to time t3, and the position deflection calculated in step 1808 of FIG. 15 decreases gradually, too. Therefore, target feedback thrust load TFaFB set based on step 1810 decreases gradually, too. Target thrust load TFa of assist clutch actuator 114 decreases gradually, too. As a result, assist motor electric current (D), assist motor torque (C), and thrust load (B) of the assist clutch actuator decrease gradually. Thereby, assist clutch position (E) moves from disengagement position PA1 to torque transmission position PA2 at the speed where the collision shock of driven plate 9a and drive plate 9b of assist clutch 9 is not occurred. At this time, return spring 9d is compressed along with the movement of assist clutch position (E).

It is judged that rpAST≧rpMVFN is satisfied in step 903 of FIG. 9 at time t3 where assist clutch position (E) moves to the vicinity of torque transmission position PA2. Movement completion judgment flag fPH1FN=1 (movement completion) is set by processing in step 504 of FIG. 9. Moreover, it is judged the movement control completion in step 402 of FIG. 4, and a disengagement control phase is begun (step 409 of FIG. 4).

A disengagement control phase, a synchronous control phase, an engagement control phase, an end control phase, and a normal control phase since time t3 are similar to ones in FIG. 11.

Thrust load (B) of the assist clutch actuator is increased rapidly in one control cycle by target feedback thrust load TFaFB calculated in step 1807 to step 1810 and target feedforward thrust load TFaFF based on function f4 set in step 1811 of FIG. 15 at the first stage of time t1. At the second stage where assist clutch position (E) moves to movement completion judgment position rpMVFN set in step 903 of FIG. 9, thrust load (B) of the assist clutch actuator is gradually decreased by target feedback thrust load TFaFB calculated in step 1807 to step 1810 of FIG. 15. At the third stage from time t3 to time t4, thrust load (B) of the assist clutch actuator is increased again. As a result, the occurrence of the collision shock between driven plate 9a and drive plate 9b of assist clutch 9 occurred by rapid action of assist clutch actuator 114 can be evaded, and the decrease in the drive performance (shift quality) can be evaded.

In FIG. 16, the time from t1 to t3 when assist clutch position (E) moves from disengagement position PA1 to torque transmission position PA2 can be shortened by target feedback thrust load TFaFB calculated in step 1807 to step 1810 of FIG. 15 compared with FIG. 11, FIG. 12, and FIG. 13.

Figure 17:
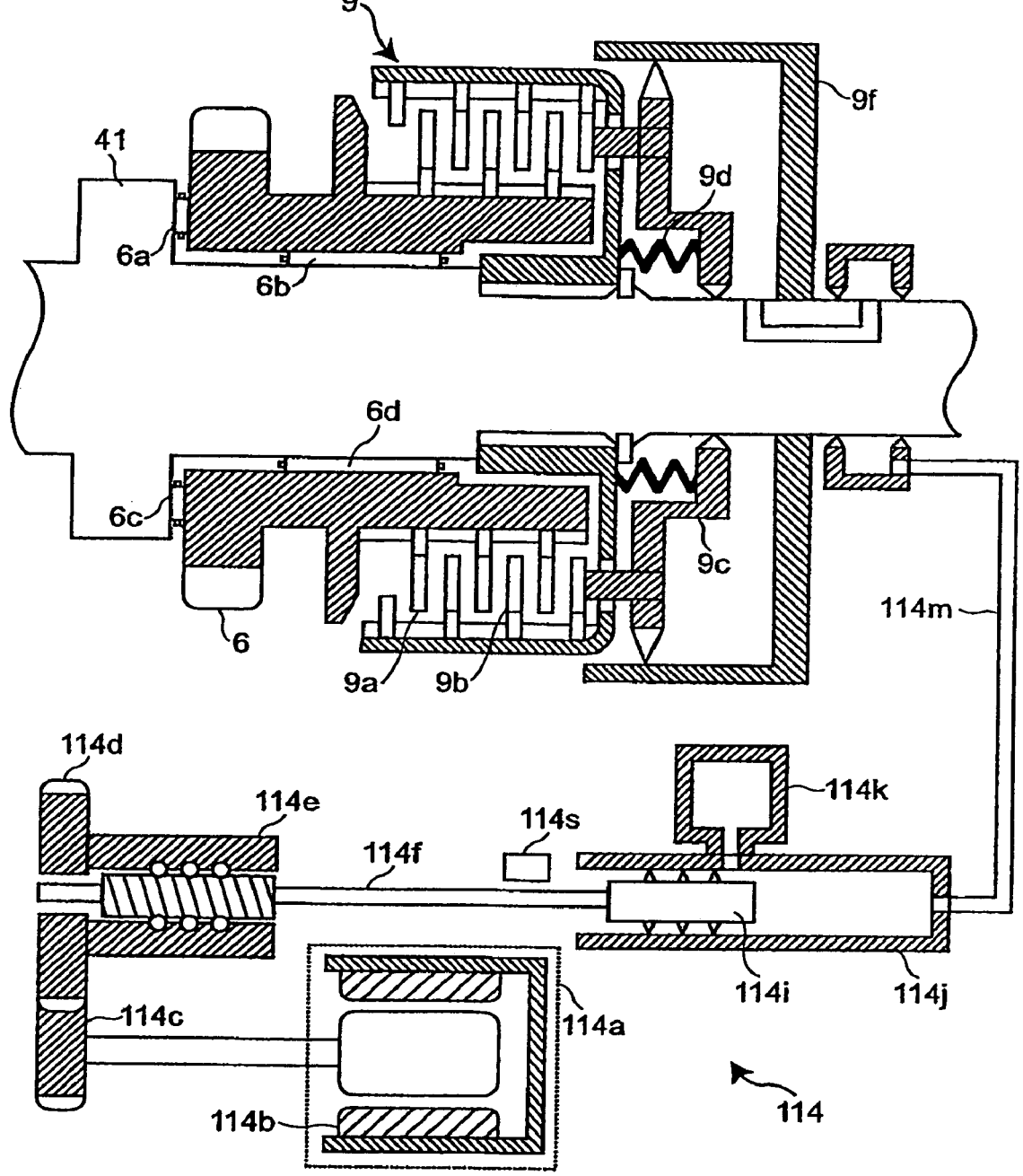
FIG. 17 is an enlarged section view of an electric actuator in an embodiment different from FIG. 2.

Next, a second example of the configuration of an electric actuator (assist clutch 9 and assist clutch actuator 114) according to the present invention is explained by using FIG. 17.

FIG. 17 is a cross section of the second example of the configuration according to one embodiment of an electric actuator according to the present invention. Further, FIG. 17 is an enlarged cross section of a part of assist clutch 9, transmission gear input shaft 41, the 6th drive gear 6, and assist clutch actuator 114 in FIG. 1. The same numeral as FIG. 2 designates same part.

A different point from the embodiment shown in FIG. 2 is that the thrust force is provided by the oil pressure in this example though the thrust force between drive plate 9b and driven plate 9a is provided by thrusting pressure ring 9e by using arm 114h and compressing return spring 9d in the configure shown in FIG. 2.

Assist motor 114a is provided in assist clutch actuator 114 shown in FIG. 17. The rotating torque generated by assist motor 114a is transferred to ball screw 114e through motor drive gear 114c and motor driven gear 114d. Rod 114f strokes according to the rotation of ball screw 114e, and thereby piston 114i strokes. Oil is filled in cylinder 114j and reservoir tank 114k. The oil passage in reservoir tank 114k is closed by the stroke of piston 114i. Oil in cylinder 114j is pushed, and the pressure of the oil filled between casing 9f and slider 9c is increased via pipes 114m. As a result, return spring 9d is compressed, thrust force works between drive plate 9b and driven plate 9a, and the rotating torque of input shaft 41 is transferred to the sixth drive gear 6. Moreover, stroke sensor 114s is provided to detect the stroke of rod 114f. The stroke of assist clutch, that is, the stroke of slider 9c is calculated from the stroke of rod 114f.

Thus, the friction transfer mechanism which transfers power by thrusting the friction side, the motor, and the connection mechanism which connects the friction transfer mechanism and the motor are provided in the present invention. The present invention is applicable for an electric actuator for various transmissions which control the thrust load of the friction transfer mechanism by controlling the rotating torque of the motor and transfer power.

Next, a second example of the configuration of the control apparatus for an automobile according to one embodiment of the present invention is explained by using FIG. 18.

FIG. 18 is a skeleton view of the second system configuration example showing one embodiment of the control apparatus for an automobile according to the present invention. The same numeral as FIG. 1 designates same part.

Automatic transmission 51 has first clutch 1608, second clutch 1609, first transmission gear input shaft 1641, second transmission gear input shaft 1643, transmission gear output shaft 1642, first drive gear 1601, second drive gear 1602, third drive gear 1603, fourth drive gear 1604, fifth drive gear 1605, first driven gear 1611, second driven gear 1612, third driven gear 1613, fourth driven gear 1614, fifth driven gear 1615, first mesh type transfer mechanism 1621, second mesh type transfer mechanism 1622, third mesh type transfer mechanism 1623, rotation sensor 31, rotation sensor 32, and rotation sensor 33.

A different point from the configuration example shown in FIG. 1 is that this configuration comprises a twin clutch though the torque of engine 7 is transferred to transmission gear input shaft 41 by engaging input shaft clutch 8 in the configuration shown in FIG. 1.

That is, the torque of engine 7 is transferred to first input shaft 1641 of the transmission gear by engaging first clutch 1608. Moreover, the torque of engine 7 is transferred to the second input shaft 1643 of the transmission by engaging the second clutch 1609. Second input shaft 1643 of the transmission is a midair. First input shaft 1641 of the transmission penetrates through the midair part of second input shaft 1643 of the transmission, and perform the relative motion in a rotational direction with respect to second input shaft 1643 of the transmission.

First drive gear 1601, third drive gear 1603 and fifth drive gear 1605 are fixed to second input shaft 1643 of the transmission. Second input shaft 1643 of the transmission gear is rotatable with respect to first input shaft 1641 of the transmission. Moreover, second drive gear 1602 and fourth drive gear 1604 is fixed to first input shaft 1641 of the transmission. First input shaft 1641 of the transmission gear is rotatable with respect to second input shaft 1643 of the transmission.

The engagement/disengagement of first clutch 1608 is carried out by first clutch actuator 1654. Moreover, the engagement/disengagement of second clutch 1609 is carried out by second clutch actuator 1655.

Sensor 31 is provided as a means for detecting the rotating speed of first input shaft 1641 of the transmission. Moreover, sensor 33 is provided as a means for detecting the rotating speed of second input shaft 1643 of the transmission.

On the other hand, first driven gear 1611, second driven gear 1612, third driven gear 1613, fourth driven gear 1614, and fifth driven gear 1615 are provided to output shaft 1642 of the transmission. First driven gear 1611, second driven gear 1612, third driven gear 1613, fourth driven gear 1614, and fifth driven gear 1615 are provided rotatably to output shaft 42 of the transmission.

Moreover, sensor 32 is provided as a means for detecting the rotating speed of output shaft 1642 of the transmission.

Moreover, first mesh type transfer mechanism 1621 is provided to engage first driven gear 1611 with output shaft 1642 of the transmission, or engage third driven gear 1613 with transmission gear output shaft 1642 between first driven gear 1611 and third driven gear 1613.

Moreover, third mesh type transfer mechanism 1623 is provided to engage second drive gear 1612 with output shaft 1642 of the transmission, or engage fourth driven gear 1614 with transmission gear output shaft 1642 between second driven gear 1612 and fourth driven gear 1614.

Moreover, second mesh type transfer mechanism 1622 to engage fifth driven gear 1615 with output shaft 1642 of the transmission is provided to fifth driven gear 1615.

Here, it is preferable to use a synchromesh type mechanism having the friction transfer mechanism, for engaging by the thrusting the friction side and synchronizing the rotating speed as said mesh type transfer mechanisms 1621, 1622 and 1623.

The rotating torque of second input shaft 1643 of the transmission can be transferred to output shaft 1642 of the transmission through first mesh type transfer mechanism 1621 by moving the position of first mesh type transfer mechanism 1621 by shift actuator 1651, and engaging with first driven gear 1611 or third driven gear 1613.

The rotating torque of first input shaft 1641 of the transmission can be transferred to output shaft 1642 of the transmission through third mesh type transfer mechanism 1623 by moving the position of third mesh type transfer mechanism 1623 by shift actuator 1653, and engaging with second driven gear 1612 or fourth driven gear 1614.

The rotating torque of second input shaft 1643 of the transmission can be transferred to output shaft 1642 of the transmission through second mesh type transfer mechanism 1622 by moving the position of second mesh type transfer mechanism 1622 by shift actuator 1652, and engaging with fifth driven gear 1615.

Next, FIG. 19 shows a timing chart of a modification example of the shift control at upshift from the first gear to the second gear configured by a twin clutch as shown in FIG. 18.

FIG. 19(A) shows the rotating speed of engine 7. Moreover, Ne_1 is a rotating speed corresponding to the first gear, and Ne_2 shows the rotating speed corresponding to the second gear. FIG. 19(B) shows the thrust load of first clutch actuator 1654. FIG. 19(C) shows the thrust load of second clutch actuator 1655. FIG. 19(D) shows the position of first clutch 1608. FIG. 19(E) shows the position of second clutch 1609. FIG. 19(F) shows the torque of output shaft 1642 of the transmission.

In FIG. 19, first driven gear 1611 is engaged with output shaft 1642 of the transmission by first mesh type transfer mechanism 1621, and the first gear are formed. Moreover, second driven gear 1612 is engaged with output shaft 1642 of the transmission by third mesh type transfer mechanism 1623, and the second gear are formed.

The shifting is begun at time t1. The position of the second clutch is at torque transmission position P C2_2 before time t1 as shown in FIG. 19(E). This is in a state of "first gear" in which the torque of engine 7 is transferred to output shaft 1642 of the transmission by second clutch 1609 through first drive gear 1601, first driven gear 1611 and first mesh type transfer mechanism 1621. The first gear position is maintained. At this time, engine speed is Ne_1 corresponding to the first gear as shown in FIG. 19(A). Moreover, the position of the first clutch is at disengagement position PC1_1 as shown in FIG. 19(D).

The first clutch thrust load (B) is increased to a fixed value from time t1 to time t2 because the first clutch position (D) moves to position PC1_2 of "Torque transmission" when the shifting is begun at time t1. The first clutch thrust load (B) is kept a fixed value from time t2 to time t3. As a result, position (D) of the first clutch moves from disengagement position PC1_1 to torque transmission position PC1_2 at the speed where the collision shock between a drive plate and a driven plate of the first clutch is not occurred. Moreover, the second clutch thrust load (C) is decreased to a fixed value.

When the first clutch position (D) moves to torque transmission position PC1_2 at time t3, the torque of engine 7 is transferred by the first clutch 1608 from time t3 to time t4. As a result, the first clutch thrust load (B) is increased to a fixed value. The second clutch thrust load (C) is decreased to a fixed value along with it.

When first clutch thrust load (B) increases to a fixed value increases, and the second clutch thrust load (C) decreases to a fixed value at time t4, engine speed (A) is synchronized with rotating speed Ne_1 corresponding to first gear to rotating speed Ne_2 corresponding to the second gear by first clutch thrust load (B), and second clutch thrust load (C) is decreased up to 0 between time t4 and time t5.

When engine speed (A) synchronizes with rotating speed Ne_2 corresponding to the second gear at time t5, The first clutch thrust load (B) is increased further and the state of "second gear" is obtained from time t5 to time t6. Moreover, the second clutch thrust load is set to a fixed value, and the second clutch position (E) is moved to disengagement position PC2_1. The control is ended at time t6 when the first clutch thrust load (B) increased.

Thus, the first clutch thrust load (B) is increased at the first stage from time t1 to time t2. Moreover, the first clutch thrust load (B) is kept constant at the second stage until the first clutch position (D) moves to torque transmission position PC1_2. At the third stage from time t3 to time t4, the first clutch thrust load (B) is increased again. As a result, the occurrence of the collision shock of the drive plate and the driven plate of the first clutch 1608 due to the rapid stroke of first clutch actuator 1654 can be evaded, and the decrease in the drive performance (shift quality) can be evaded.

The embodiment of the present invention is an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism wherein said electric motor is controlled so that the moving speed of said friction side may become smaller than that when said friction side begins moving before at least the completion of the movement on said friction side, when the control is begun, and the friction side of said friction transfer mechanism is moved to the position where the power is to be transferred.

The embodiment of the present invention is an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism, wherein said electric motor is controlled so that the thrust load of said friction transfer mechanism may be increased with a fixed inclination, at the first stage from the time said friction side begins to move to the time the predetermined time elapses, the inclination of the thrust load of said friction transfer mechanism may be set to the inclination smaller than that of the thrust load of said friction transfer mechanism at said first stage, at the second-stage from said first stage to the time the predetermined time elapses further, and the thrust load of said friction transfer mechanism may be increased with the inclination larger than that of the thrust load of said friction transfer mechanism at said second stage, at the third stage from said second stage to the time the predetermined time elapses further.

The embodiment of the present invention is an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism, wherein said electric motor is controlled so that the command current for said electric motor may be increased with a fixed inclination, at the first stage from the time said friction side begins to move to the time the predetermined time elapses, the command current for said electric motor may be set to the inclination smaller than that of the thrust load of said friction transfer mechanism at said first stage, at the second stage from said first stage to the time the predetermined time elapses further, and the command current for said electric motor may be increased with the inclination larger than that of the thrust load of said friction transfer mechanism at said second stage, at the third stage from said second stage to the time the predetermined time elapses further.

The embodiment of the present invention is an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism, wherein said electric motor is controlled so that the current for said electric motor may be increased with a fixed inclination, at the first stage from the time said friction side begins to move to the time the predetermined time elapses, the current for said electric motor may be set to the inclination smaller than that of the thrust load of said friction transfer mechanism at said first stage, at the second stage from said first stage to the time the predetermined time elapses further, and the current for said electric motor may be increased with the inclination larger than that of the thrust load of said friction transfer mechanism at said second stage, at the third stage from said second stage to the time the predetermined time elapses further.

Preferably, in the above embodiment, the electric actuator of automatic transmission controls the inclination at said second stage so as to be 0 or less.

The embodiment of the present invention is an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism, wherein said electric motor is controlled so that the thrust load of said friction transfer mechanism may be increased with a fixed inclination, at the first stage from the time said friction side begins to move to the time the predetermined time elapses, the inclination of the thrust load of said friction transfer mechanism may be set to the inclination smaller than that of the thrust load of said friction transfer mechanism at said first stage, at the second stage from said first stage to the time said friction transfer mechanism moves to the predetermined position, and the thrust load of said friction transfer mechanism may be increased with the inclination larger than that of the thrust load of said friction transfer mechanism at said second stage, at the third stage from said second stage to the time the predetermined time elapses further.

The embodiment of the present invention is an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism wherein said electric motor is controlled so that the command current for said electric motor may be increased with a fixed inclination, at the first stage from the time said friction side begins to move to the time the predetermined time elapses, the command current for said electric motor may be set to the inclination smaller than that of the thrust load of said friction transfer mechanism at said first stage, at the second stage from said first stage to the time said friction transfer mechanism moves to the predetermined position, and the command current for said electric motor may be increased with the inclination larger than that of the thrust load of said friction transfer mechanism at said second stage, at the third stage from said second stage to the time the predetermined time elapses further.

The embodiment of the present invention is an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism wherein said electric motor is controlled so that the current for said electric motor may be increased with a fixed inclination, at the first stage from the time said friction side begins to move to the time the predetermined time elapses, the current for said electric motor may be set to the inclination smaller than that of the thrust load of said friction transfer mechanism at said first stage, at the second stage from said first stage to the time said friction transfer mechanism moves to the predetermined position, and the current for said electric motor may be increased with the inclination larger than that of the thrust load of said friction transfer mechanism at said second stage, at the third stage from said second stage to the time the predetermined time elapses further.

Preferably, in the above embodiment, the electric actuator of automatic transmission controls the inclination at said second stage so as to be 0 or less.

The embodiment of the present invention is an electric actuator of an automatic transmission comprising a friction transfer mechanism which transfers power by thrusting the friction side, an electric motor, and a connection mechanism which connects said electric motor with said friction transfer mechanism, further comprising an electric actuator which transfers power by controlling said electric motor to control the thrust load of said friction transfer mechanism, wherein the power is transferred by controlling said electric motor to control the thrust load of said friction transfer mechanism, and wherein the thrust load of said friction transfer mechanism may be increased with a fixed inclination, at the first stage from the time said friction side begins to move to the time the predetermined time elapses, the inclination of the thrust load of said friction transfer mechanism may be set to the inclination smaller than that of the thrust load of said friction transfer mechanism at said first stage, at the second stage from said first stage to the time said friction transfer mechanism moves to the predetermined position, and the thrust load of said friction transfer mechanism may be increased with the inclination larger than that of the thrust load of said friction transfer mechanism at said second stage, at the third stage from said second stage to the time the predetermined time elapses further.

The embodiment of the present invention is a control method of an electric actuator comprising a friction transfer mechanism which transfers power by thrusting the friction side, an electric motor, and a connection mechanism which connects said electric motor with said friction transfer mechanism, wherein the power is transferred by controlling said electric motor to control the thrust load of said friction transfer mechanism, and wherein said electric motor is controlled so that the thrust load of said friction transfer mechanism m ay be increased with a fixed inclination, at the first stage from the time said friction side begins to move to the time the predetermined time elapses, the inclination of the thrust load of said friction transfer mechanism may be set to the inclination smaller than that of the thrust load of said friction transfer mechanism at said first stage, at the second stage from said first stage to the time said friction transfer mechanism moves to the predetermined position, and the thrust load of said friction transfer mechanism may be increased with the inclination larger than that of the thrust load of said friction transfer mechanism at said second stage, at the third stage from said second stage to the time the predetermined time elapses further.

What is claimed is:

1. A control apparatus for an automatic transmission having a friction transfer mechanism by which power is transferred by thrusting a friction side and an electric motor which controls a thrust load of said friction transfer mechanism, thrust force given by said motor being transferred to said friction side through a thrust force transfer member provided between said friction side and said motor, wherein when said friction side is thrusted by said electric motor, said electric motor is controlled by setting a period during which said thrust force transfer member is moved at a moving speed lower than that when beginning to move between a time said friction transfer mechanism begins to transfer power and a time said thrust force transfer member begins to move, and wherein said electric motor is controlled so that the thrust load of said friction transfer mechanism may be increased with a fixed inclination, at a first stage from the time said thrust force transfer member begins to move until a predetermined time elapses, the inclination of the thrust load of said friction transfer mechanism may be set to be smaller than that of the thrust load of said friction transfer mechanism at said first stage, at a second stage from said first stage until the predetermined time elapses further, and the thrust load of said friction transfer mechanism may be increased with an inclination larger than that of the thrust load of said friction transfer mechanism at said second stage, at a third stage from said second stage until the predetermined time elapses further.

2. A control apparatus for the automatic transmission according to claim 1, wherein the inclination at said second stage is 0 or less.

3. A control apparatus for the automatic transmission for an automatic transmission having a friction transfer mechanism by which power is transferred by thrusting a friction side and an electric motor which controls a thrust load of said friction transfer mechanism, thrust force given by said motor being transferred to said friction side through a thrust force transfer member provided between said friction side and said motor, wherein when said friction side is thrusted by said electric motor, said electric motor is controlled by setting a period during which said thrust force transfer member is moved at a moving speed lower than that when beginning to move between a time said friction transfer mechanism begins to transfer power and a time said thrust force transfer member begins to move, and wherein said electric motor is controlled so that a command current for said electric motor may be increased with a fixed inclination, at a first stage from the time said friction side begins to move until a predetermined time elapses, the command current for said electric motor may be set to an inclination smaller than that of the thrust load of said friction transfer mechanism at said first stage, at a second stage from said first stage until the predetermined time elapses further, and the command current for said electric motor may be increased with an inclination larger than that of the thrust load of said friction transfer mechanism at said second stage, at a third stage from said second stage until the predetermined time elapses further.

4. A control apparatus for the automatic transmission according to claim 3, wherein the inclination at said second stage is 0 or less.

* * * * *